United States Patent
Kobayashi et al.

(10) Patent No.: US 8,019,773 B2
(45) Date of Patent: Sep. 13, 2011

(54) PRESENTING CONTENTS IN ACCORDANCE WITH USER PREFERENCES

(75) Inventors: Yoshiyuki Kobayashi, Tokyo (JP); Ryo Mukaiyama, Tokyo (JP); Hiroshi Ogino, Tokyo (JP); Soichi Fukasawa, Saitama (JP)

(73) Assignee: Sony Corporation, Tokyo (JP)

( * ) Notice: Subject to any disclaimer, the term of this patent is extended or adjusted under 35 U.S.C. 154(b) by 559 days.

(21) Appl. No.: 12/039,070

(22) Filed: Feb. 28, 2008

(65) Prior Publication Data

US 2009/0043758 A1    Feb. 12, 2009

(30) Foreign Application Priority Data

Mar. 2, 2007   (JP) .................. 2007-052624

(51) Int. Cl.
*G06F 17/30* (2006.01)
(52) U.S. Cl. .......... 707/769; 707/706; 707/707
(58) Field of Classification Search .......... None
See application file for complete search history.

(56) References Cited

U.S. PATENT DOCUMENTS

| | | | |
|---|---|---|---|
| 6,202,058 B1 | 3/2001 | Rose et al. | |
| 2003/0021055 A1* | 1/2003 | Tange et al. | 360/72.1 |
| 2004/0144238 A1* | 7/2004 | Gayama | 84/613 |
| 2007/0028266 A1* | 2/2007 | Trajkovic et al. | 725/46 |
| 2010/0138219 A1* | 6/2010 | Oshikiri | 704/219 |

FOREIGN PATENT DOCUMENTS

| | | |
|---|---|---|
| JP | 2000-207415 | 7/2000 |
| WO | WO 95/29451 | 11/1995 |
| WO | WO 02/27508 A1 | 4/2002 |

OTHER PUBLICATIONS

T. Umeda et al., "Design and Development of a Cooperative Shopping System with Shared Discussion Space," Proc. 1999 ICPP Workshops, Sep. 21, 1999, pp. 100-105.

J. Tatemura, "Visual Querying and Explanation of Recommendations from Collaborative Filtering Systems," Proc. Int. Conf. on Intelligent User Interfaces, Jan. 5, 1999, p. 189.

L. Terveen, et al., "Specifying Preferences Based on User History," Proc. Chi 2002, Conf. on Human Factors in Computing Systems, Apr. 20-25, 2002, pp. 315-322.

\* cited by examiner

*Primary Examiner* — Baoquoc To

(74) *Attorney, Agent, or Firm* — Finnegan, Henderson, Farabow, Garrett & Dunner, L.L.P.

(57) ABSTRACT

In an information processing apparatus adapted to determine information, to be presented to a user, as to one or more contents, a calculation unit calculates the similarity between a first search axis, produced on the basis of information associated with the user, for use as a reference on the basis of which to present contents and a second search axis, produced on the basis of information associated with one of other users, for use as a reference on the basis of which to present contents, and a display control unit controls displaying of information associated with contents with reference to first and second search axes detected as being similar to each other.

13 Claims, 30 Drawing Sheets

FIG. 4

| | FEATURE VALUE #1 | FEATURE VALUE #2 | FEATURE VALUE #3 | ... | PREFERENCE |
|---|---|---|---|---|---|
| MUSIC #1 | 24 | 74 | 68 | ... | 5 |
| MUSIC #2 | 17 | 81 | 50 | ... | 3 |
| MUSIC #3 | 33 | 75 | 97 | ... | 2 |
| ... | ... | ... | ... | ... | ... |

FEATURE VALUE OF MUSIC

FIG. 5

| | FEATURE VALUE #1 | FEATURE VALUE #2 | FEATURE VALUE #3 | ... | PREFERENCE |
|---|---|---|---|---|---|
| MUSIC #1 | 24 | 74 | 68 | ... | LIKE |
| MUSIC #2 | 17 | 81 | 50 | ... | LIKE |
| MUSIC #3 | 33 | 75 | 97 | ... | DISLIKE |
| ... | ... | ... | ... | ... | ... |

FEATURE VALUE OF MUSIC

FIG. 9

```
PLAYBACK HISTORY
MUSIC     OPERATION   DATE/TIME
MUSIC #1  PLAY        09/07/2006  14:04
MUSIC #2  PLAY        09/07/2006  14:08
MUSIC #3  PLAY        09/07/2006  14:13
MUSIC #3  SKIP        09/07/2006  14:15
MUSIC #4  PLAY        09/07/2006  14:15
MUSIC #4  STOP        09/07/2006  14:18
. . .
```

FIG. 10

| MUSIC | PREFERENCE | INTERESTING | FOR PARENTS | OLD |
|---|---|---|---|---|
| MUSIC #1 | 5 | 3 | 1 | |
| MUSIC #2 | 3 | 1 | 2 | 3 |
| MUSIC #3 | | 5 | | 1 |
| MUSIC #4 | 1 | | 5 | 3 |
| MUSIC #5 | 5 | | 1 | |
| MUSIC #6 | 4 | 4 | | 2 |
| . . . | | | | |

FIG. 11

```
TRAINING DATA
MUSIC      ANSWER DATA
MUSIC #1   5
MUSIC #3   4
MUSIC #6   2
MUSIC #12  3
MUSIC #16  1
   . . .
```

| | PREFERENCE | PLAYBACK FREQUENCY |
|---|---|---|
| MUSIC #1 | 0.5 | 0.2 |
| MUSIC #2 | 0.4 | 0.5 |
| MUSIC #3 | 0.1 | 0.4 |
| MUSIC #4 | 0.2 | 0.1 |
| MUSIC #5 | 0.4 | 0.2 |
| MUSIC #6 | 0.3 | 0.5 |
| MUSIC #7 | 0.2 | 0.2 |
| MUSIC #8 | 0.5 | 0.4 |

SIMILARITY 0.1

| | LIKED | PLAYED FREQUENTLY |
|---|---|---|
| MUSIC #1 | YES | NO |
| MUSIC #2 | YES | YES |
| MUSIC #3 | NO | YES |
| MUSIC #4 | NO | NO |
| MUSIC #5 | YES | NO |
| MUSIC #6 | NO | YES |
| MUSIC #7 | NO | NO |
| MUSIC #8 | YES | YES |

SIMILARITY 0.5

FIG. 24

| | PREFERENCE | PLAYBACK FREQUENCY | EXCELLENCE | CONSOLATION | ... |
|---|---|---|---|---|---|
| PREFERENCE | 0.5 | 0.8 | 0.9 | 0.6 | |
| PLAYBACK FREQUENCY | 0.4 | 0.5 | 0.9 | 0.5 | |
| MUSICAL SENSE | 0.7 | 0.6 | 0.4 | 0.1 | |
| WILDNESS | 0.5 | 0.9 | 0.3 | 0.8 | |
| ... | | | | | |

SEARCH AXIS OF USER / SEARCH AXIS OF ANOTHER USER UNDER COMPARISON

FIG. 25

| | PREFERENCE | PLAYBACK FREQUENCY | EXCELLENCE | CONSOLATION | ... |
|---|---|---|---|---|---|
| PREFERENCE | 0.5 | 0.8 | 0.9 | 0.6 | |
| PLAYBACK FREQUENCY | 0.4 | 0.5 | 0.9 | 0.5 | |
| MUSICAL SENSE | 0.7 | 0.6 | 0.4 | 0.1 | |
| WILDNESS | 0.5 | 0.9 | 0.3 | 0.8 | |
| ... | | | | | |

SEARCH AXIS OF USER / SEARCH AXIS OF ANOTHER USER UNDER COMPARISON

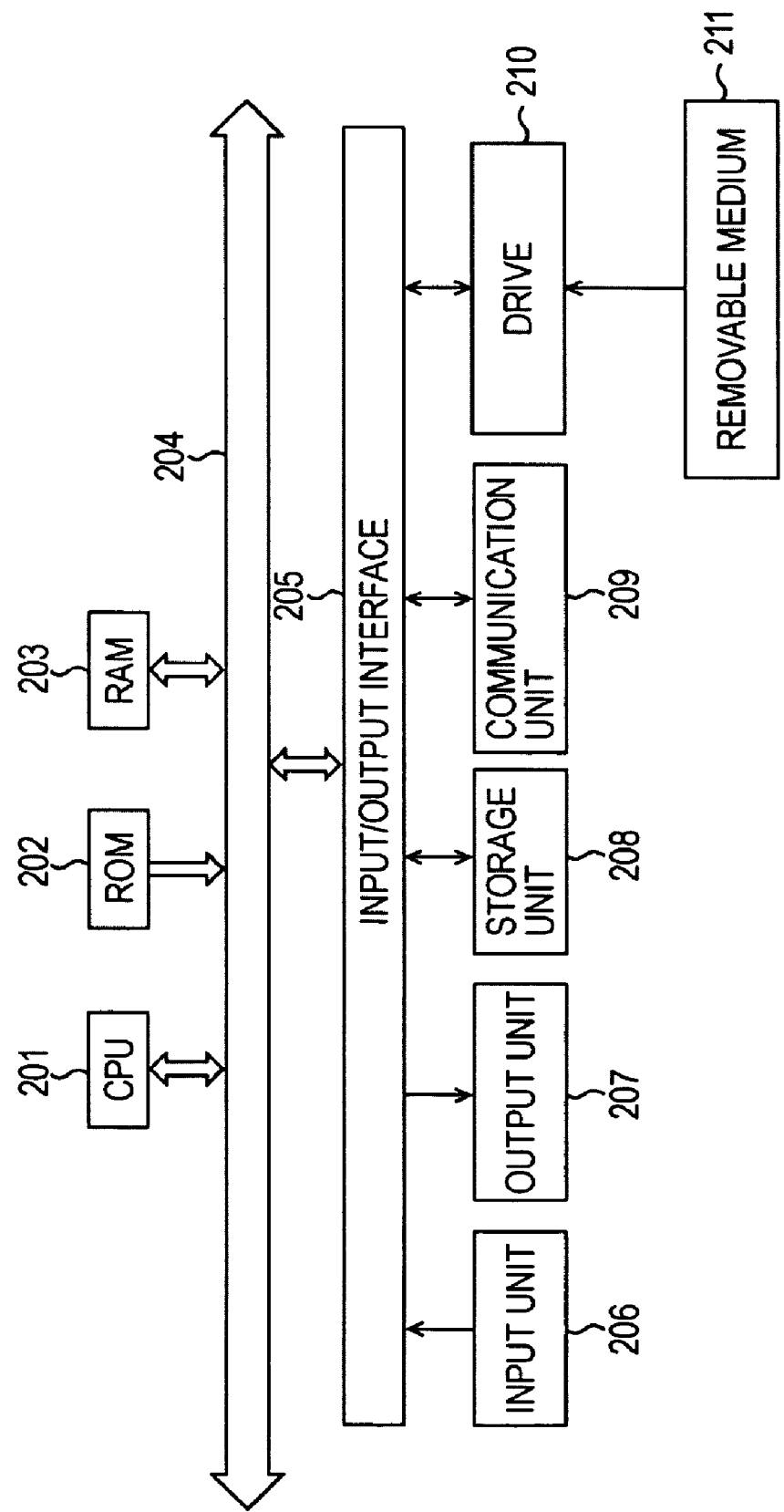

PRESENTING CONTENTS IN ACCORDANCE WITH USER PREFERENCES

CROSS REFERENCES TO RELATED APPLICATIONS

The present invention contains subject matter related to Japanese Patent Application JP 2007-052624 filed in the Japanese Patent Office on Mar. 2, 2007, the entire contents of which are incorporated herein by reference.

BACKGROUND OF THE INVENTION

1. Field of the Invention

The present invention relates to an information processing apparatus, an information processing method, and an information processing program, and more particularly, to an information processing apparatus, an information processing method, and an information processing program, of presenting contents.

2. Description of the Related Art

It is known to present contents such as music contents or movie contents in accordance with metadata attached to the contents.

Some recording/playback apparatus have a capability of providing information to a user on the basis of variable data numerically representing feelings given by information, in response to an operation performed by the user (see, for example, Japanese Unexamined Patent Application Publication No. 2000-207415).

SUMMARY OF THE INVENTION

However, in the above-described technique, contents are presented in accordance only with preference of the user, and preference of other users is not taken into account at all. Besides, the user is not allowed to know tendency of other users in selecting contents.

In view of the above, it is desirable to provide a technique which allows a user to easily know preference of other users in selection of contents, and a technique of presenting contents to a user not only in accordance with preference of the user but also in accordance with preference of other users.

According to an embodiment of the present invention, there is provided an information processing apparatus adapted to determine information, to be presented to a user, as to one or more contents, including calculation means for calculating the similarity between a first search axis, produced on the basis of information associated with the user, for use as a reference on the basis of which to present contents and a second search axis, produced on the basis of information associated with one of other users, for use as a reference on the basis of which to present contents, and displaying control means for controlling displaying of information associated with contents with reference to first and second search axes detected as being similar to each other.

In the calculation of the similarity between the first and second search axes performed by the calculation means, the first search axis may be produced on the basis of feature values of contents and a history of playback of the contents performed by the user or evaluations on the contents given by the user, and the second search axis may be produced on the basis of feature values of contents and a history of playback of the contents performed by the one of the other users or evaluations on the contents given by the one of the other users.

In the calculation of the similarity between the first and second search axes performed by the calculation means, the calculation means may calculate the similarity between values of contents indicated by the first search axis and values of the contents indicated by the second search axis, and the calculation means may employ the resultant similarity as the similarity between the first search axis and the second search axis.

In the calculation of the similarity between the first and second search axes performed by the calculation means, the calculation means may calculate the correlation coefficient between the values indicated by the first search axis determined for the contents in accordance with a first regression equation and the values indicated by the second search axis determined for the contents in accordance with a second regression equation, and the calculation means may employ the resultant correlation coefficient as the similarity between the first search axis and the second search axis.

In the calculation of the similarity between the first and second search axes performed by the calculation means, the calculation means may calculate the coincidence rate between the values indicated by the first search axis determined for the contents in accordance with a first discriminant and the values indicated by the second search axis determined for the contents in accordance with a second discriminant, and the calculation means may employ the resultant coincidence rate as the similarity between the first search axis and the second search axis.

The displaying control means may display information associated with contents satisfying a predetermined condition in terms of the value indicated by a second search axis selected by the user from second search axes detected as being similar to the first search axis.

The information processing apparatus may further include selection means for selecting a content which is within a specified range in terms of the value indicated by the first search axis and which is also within a specified range in terms of the value indicated by the second search axis, from contents whose values with respect to the first and second search axes are displayed.

When the displaying control means controls displaying information associated with contents, the displaying control means may display an image indicating the first search axis and a mage indicating the second search axis detected as being similar to the first search axis in a superimposed manner.

According to an embodiment of the present invention, there is provided an information processing method of determining information, to be presented to a user, as to one or more contents, including the steps of calculating the similarity between a first search axis, produced on the basis of information associated with the user, for use as a reference on the basis of which to present contents and a second search axis, produced on the basis of information associated with one of other users, for use as a reference on the basis of which to present contents, and controlling displaying of information associated with contents with reference to first and second search axes detected as being similar to each other.

According to an embodiment of the present invention, there is provided a program executable by a computer to perform a process of determining information which is associated with one or more contents and which is to be presented to a user, the process including the steps of calculating the similarity between a first search axis, produced on the basis of information associated with the user, for use as a reference on the basis of which to present contents and a second search axis, produced on the basis of information associated with one of other users, for use as a reference on the basis of which to present contents, and controlling displaying of information associated with contents with reference to first and second search axes detected as being similar to each other.

In the information processing apparatus, information processing method, and the information processing program described above, the calculation is performed to determine the similarity between a first search axis, produced on the basis of information associated with the user, for use as a reference on the basis of which to present contents and a second search axis, produced on the basis of information associated with one of other users, for use as a reference on the basis of which to present contents, and displaying of contents is controlled with reference to first and second search axes detected as being similar to each other.

The present invention has the great advantage that the user can easily know preference of other users in selection of contents, and the user is allowed to select contents not only in accordance with preference of the user but also in accordance with preference of other users.

BRIEF DESCRIPTION OF THE DRAWINGS

FIG. 4 shows an example of a set of feature values of music and feedback values;

FIG. 5 shows an example of a set of feature values of music and feedback values;

FIG. 6 shows an example of a set of values of search axes calculated from feature values of music;

FIG. 7 shows an example of a set of values of search axes calculated from feature values of music;

FIG. 9 shows an example of data indicating a history of playback of music performed by a user;

FIG. 10 shows an example of a set of feedback values;

FIG. 11 shows an example of training data;

FIG. 24 shows an example of a set of similarity values of search axes;

FIG. 25 shows an example of a set of similarity values of search axes;

FIG. 36 is a block diagram illustrating an example of a hardware configuration of a computer.

DESCRIPTION OF THE PREFERRED EMBODIMENTS

Before describing embodiments of the present invention, the correspondence between the features of the invention and the specific elements disclosed in embodiments of the present invention is discussed below. This description is intended to assure that embodiments supporting the invention are described in this specification. Thus, even if an element in the following embodiments is not described as relating to a certain feature of the present invention, that does not necessarily mean that the element does not relate to that feature of the invention. Conversely, even if an element is described herein as relating to a certain feature of the invention, that does not necessarily mean that the element does not relate to other features of the invention.

According to an embodiment of the present invention, there is provided an information processing apparatus adapted to determine information, to be presented to a user, as to one or more contents (for example, music contents), including calculation means (for example, a search axis comparison unit 44 shown in FIG. 2) for calculating the similarity between a first search axis, produced on the basis of information associated with the user, for use as a reference on the basis of which to present contents and a second search axis, produced on the basis of information associated with one of other users, for use as a reference on the basis of which to present contents, and displaying control means (for example, a display 45 shown in FIG. 2) for controlling displaying of information associated with contents with reference to first and second search axes detected as being similar to each other.

The information processing apparatus may further include selection means (for example, a music selection unit 41 shown in FIG. 2) for selecting a content which is within a specified range in terms of the value indicated by the first search axis and which is also within a specified range in terms of the value indicated by the second search axis, from contents whose values with reference to the first and second search axes are displayed.

Figure 35:
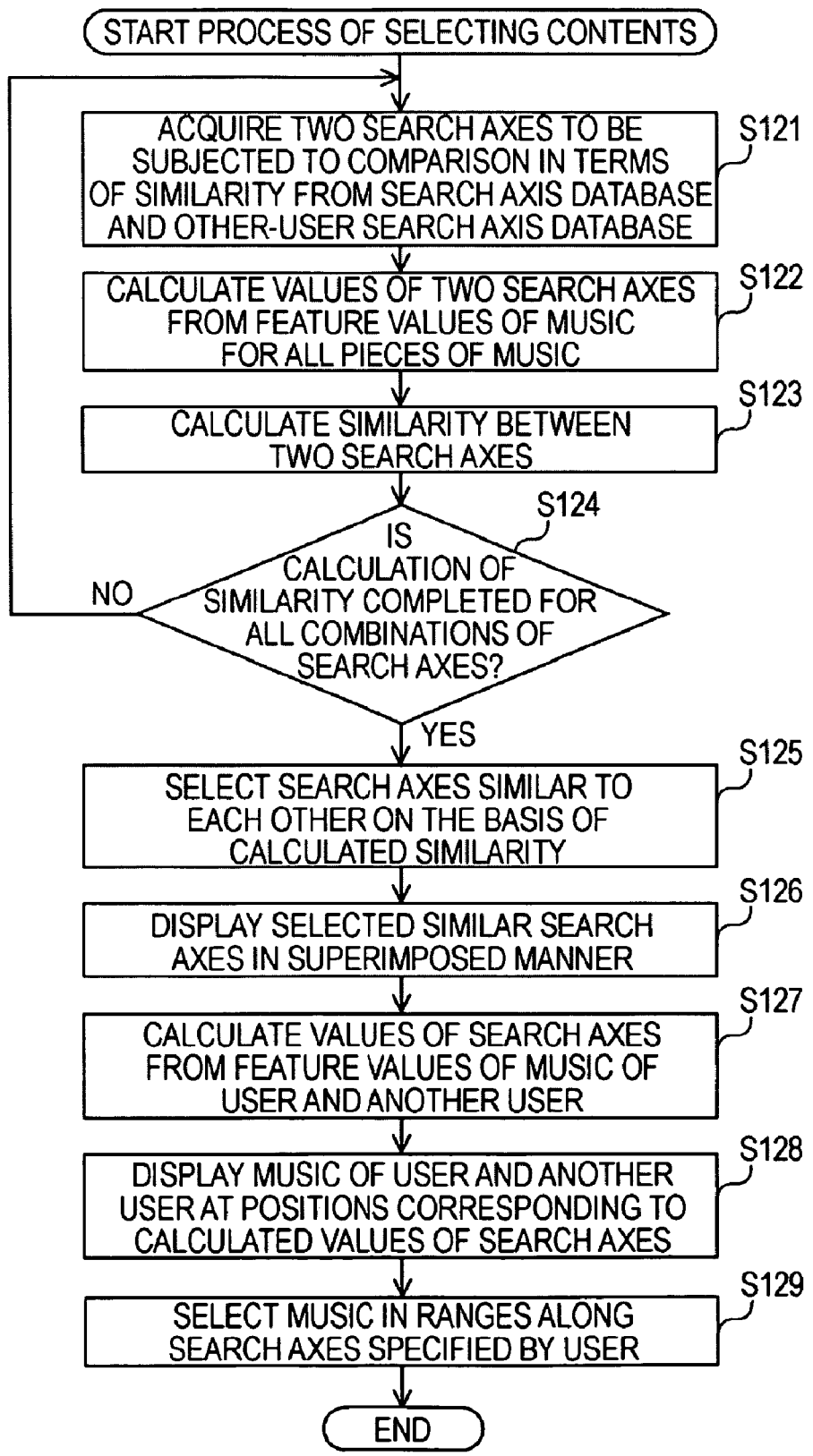
FIG. 35 is a flow chart illustrating a content selection process.

According to an embodiment of the present invention, there is provided an information processing method/program including the steps of calculating the similarity between a first search axis, produced on the basis of information associated with the user, for use as a reference on the basis of which to present contents (for example, music contents) and a second search axis, produced on the basis of information associated with one of other users, for use as a reference on the basis of which to present contents (for example, in step S123 in FIG. 24), and controlling displaying of information associated with contents with reference to first and second search axes detected as being similar to each other (for example, in step S128 in FIG. 35).

Figure 1:
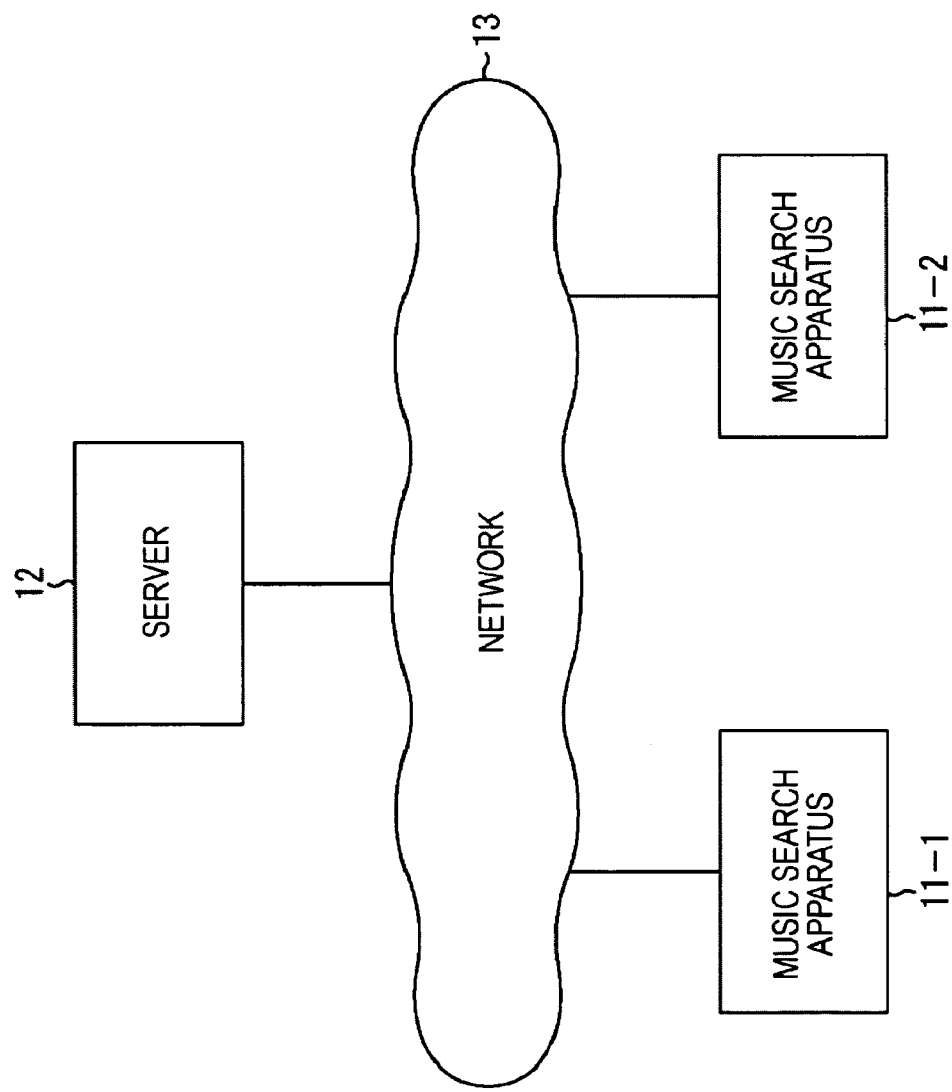
FIG. 1 is a block diagram showing an example of a music search system.

FIG. 1 is a block diagram illustrating an example of a music search system. The music search system includes a music search apparatus 11-1, a music search apparatus 11-2, a server 12, and a network 13.

The music search apparatus 11-1, the music search apparatus 11-2, and the server 12 are connected to each other via the network 13.

The music search apparatus 11-1 and the music search apparatus 11-2 are each implemented by, for example, an information processing apparatus adapted to collect information associated with a plurality of pieces of music as an example of contents.

Contents refer to information useful for a user, such as music (sound/voice), moving images, still images, text, data or programs. In the following explanation, by way of example, it is assumed that music is presented as a content to a user.

The music search apparatus 11-1 and the music search apparatus 11-2 produces axes used as references on the basis of which to present particular pieces of music (hereinafter such axes will be referred to simply as search axes) via learning as to search axes determined on the basis of feature values of contents and a history of playback of contents performed by the user or evaluations of contents given by the user, and controls displaying associated with presentation of particular pieces of music on the basis of the produced search axes.

The search axes are bases according to which to present contents depending on information associated with contents. More specifically, for example, each search axis is a coordinate axis which extends in a space and which defines a position (coordinate position) of each content depending on information associated with each content.

The search axes may be coordinate axes in an arbitrary coordinate system. For example, the search axes may be linear coordinate axes in a space of a Cartesian coordinate system or a nonorthogonal coordinate system, or the search axes may be linear or curvilinear coordinate axes or angular references in a circular coordinate system, a polar coordinate system such as a cylindrical coordinate system or a spherical coordinate system, etc. Note that the search axis does not necessarily need to be displayed.

For example, the music search apparatus 11-1 calculates the similarity between a search axis produced based on information associated with a user of the music search apparatus 11-1 and functioning as a reference according to which to present music and a search axis produced based on information associated with a user of the music search apparatus 11-2, and the music search apparatus 11-1 displays values of music with reference to two search axes detected as being similar to each other. Similarly, the music search apparatus 11-2 calculates the similarity between a search axis produced based on information associated with a user of the music search apparatus 11-2 and functioning as a reference according to which to present music and a search axis produced based on information associated with a user of the music search apparatus 11-1, and the music search apparatus 11-2 displays values of music with reference to two search axes detected as being similar to each other.

The music search apparatus 11-1 acquires the search axis produced on the basis of the information associated with the user of the music search apparatus 11-2 from the music search apparatus 11-2 via the network 13. The music search apparatus 11-2 acquires the search axis produced on the basis of the information associated with the user of the music search apparatus 11-1 from the music search apparatus 11-1 via the network 13.

As will be described in further detail later, the value of each content with reference to each search axis is determined in accordance with a regression equation or a discriminant. Thus, acquisition of a search axis is equivalent to acquisition of a regression equation or a discriminant representing the search axis.

The server 12 acquires the search axes produced on the basis of information associated with the users of the music search apparatus 11-1 and the music search apparatus 11-2 via the network 13, and the server 12 stores the acquired search axes. The server 12 provides the stored search axes produced on the basis of the information associated with the users to the music search apparatus 11-1 and the music search apparatus 11-2 via the network 13.

Hereinafter, when it is not necessary to distinguish between the music search apparatus 11-1 and the music search apparatus 11-2, an expression "music search apparatus 11" will be used.

Figure 2:
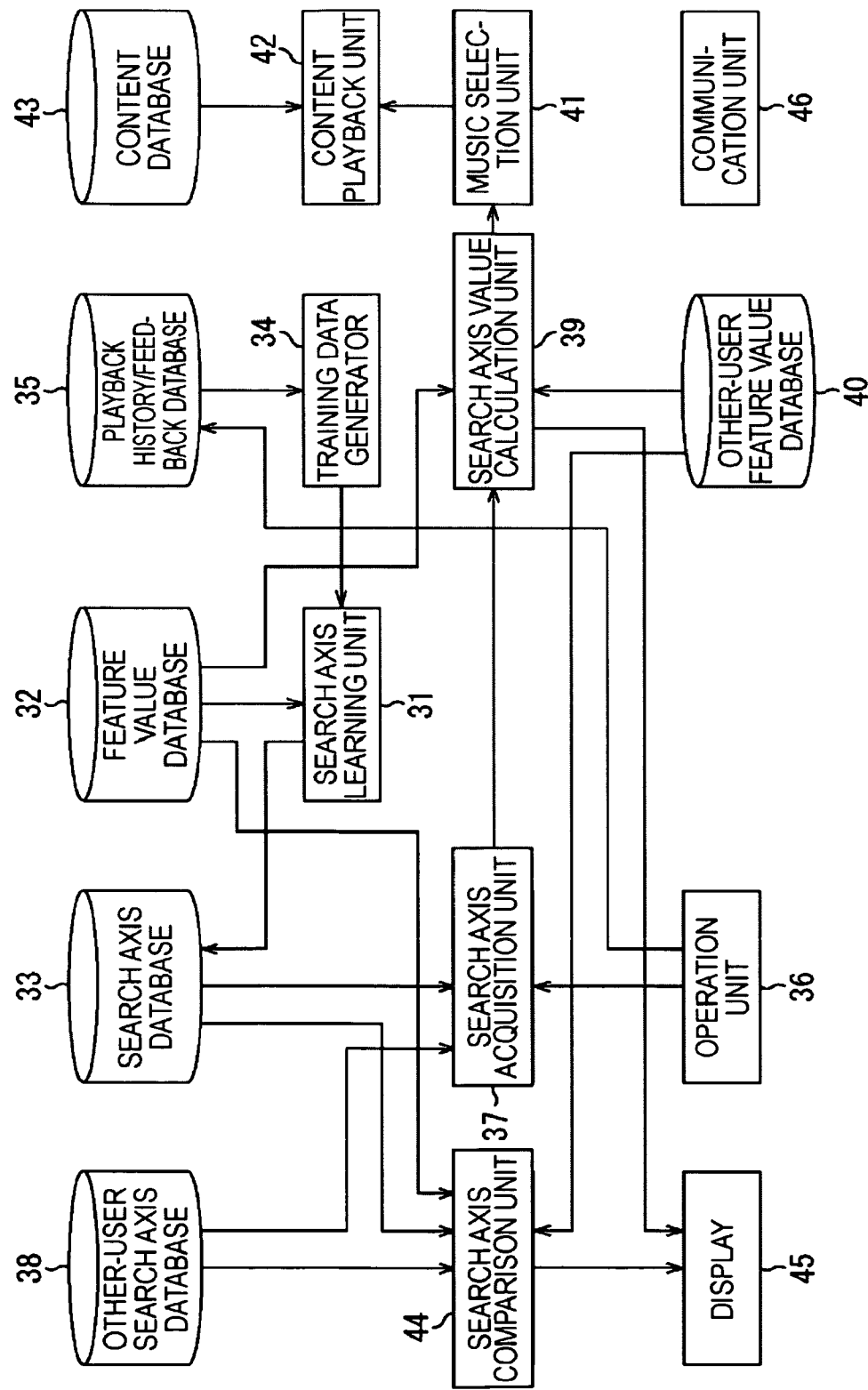
FIG. 2 is a block diagram showing an example of a configuration of a music search apparatus.

FIG. 2 is a block diagram illustrating an example of a configuration of a music search apparatus 11, which is an example of an information processing apparatus according to an embodiment of the present invention. The music search apparatus 11 includes a search axis learning unit 31, a feature value database 32, a search axis database 33, a training data producing unit 34, a playback history/feedback database 35, an operation unit 36, a search axis acquisition unit 37, an other-user search axis database 38, a search axis value calculation unit 39, an other-user feature value database 40, a music selection unit 41, a content playback unit 42, a content database 43, a search axis comparison unit 44, a display 45, and a communication unit 46.

The search axis learning unit 31 produces search axes serving as references according to which to present music via learning on search axes determined on the basis of feature values of respective pieces of music and a history of playback of music performed by a user or evaluations on the respective pieces of music given by the user. More specifically, the search axis learning unit 31 produces search axes used as references according to which to present music, via learning using feature values of music supplied from the feature value database 32 and the history of playback of music performed by the user or evaluations on music by the user supplied from the playback history/feedback database 35 via the training data producing unit 34.

The feature value may any value indicating a feature of a content. For example, the feature value may be metadata or may be calculated from metadata of a content or from the content itself.

More specifically, for example, the search axis learning unit 31 determines the regression equation or the discriminant by which to calculate a value with reference to the search axis according to which to present music (hereinafter referred to simply as a value of the search axis) via the learning using feature values of music supplied from the feature value database 32 and the history of playback of music or the evaluations on music supplied from the training data producing unit 34.

The search axis learning unit 31 supplies the produced search axes to the search axis database 33. That is, the search axis learning unit 31 supplies the regression equation or the discriminant from which to calculate the value of the search axis used as references on the basis of which to present music.

The feature value database 32 stores feature values of music that users have. More specifically, for example, the feature value database 32 stores metadata employed as feature values of music.

The search axis database 33 stores search axes, produced by the search axis learning unit 31, for use as references on the basis of which to present music. In other words, the search axis database 33 stores regression equations or discriminants according to which to calculate values of search axes used as references on the basis of which to present music.

The training data producing unit 34 removes data unnecessary in learning of search axis to be produced, from the history of playback of music performed by the user or evaluations on music performed by the user supplied from the playback history/feedback database 35, and the training data producing unit 34 produces training data for use in learning performed by the search axis learning unit 31. The training data producing unit 34 supplies the produced training data to the search axis learning unit 31.

The playback history/feedback database 35 stores histories of playback of music performed by users and evaluations on music fed back from users. The playback history/feedback database 35 supplies stored histories of playback of music performed by users and evaluations on music performed by users to the training data producing unit 34.

The operation unit 36 includes buttons, a keyboard, a mouse, and a remote controller, or a touchpad, and also includes a controller adapted to control the parts described above. If a user operates the operation unit 36, information indicating a search axis used in search is supplied, depending on the operation performed by the user, to the search axis acquisition unit 37, or a feedback value indicating an evaluation on music performed by the user is supplied, depending on the operation performed by the user, to the playback history/feedback database 35.

In a state in which information associated with music with reference to the search axis is displayed on the display 45, if the user operates the operation unit 36 to specify a range with reference to the search axis, the operation unit 36 supplies information indicating the specified range to the music selection unit 41.

The search axis acquisition unit 37 acquires a search axis to be used in searching from the search axis database 33. The search axis acquisition unit 37 also acquires a search axis, produced on the basis of information associated with another user, for use in searching from the other-user search axis database 38.

The search axis acquisition unit 37 supplies the acquired search axes to the search axis value calculation unit 39.

The other-user search axis database 38 stores search axes, produced on the basis of information associated with other users, for use as references according to which to present music. In other words, the other-user search axis database 38 stores regression equations or discriminants from which to calculate values of search axes, produced on the basis of information associated with other users, for use as references according to which to present music.

For example, if the communication unit 46 receives the search axis from another music search apparatus 11 or the server 12 via the network 13, the communication unit 46 transfers the received search axis to the other-user search axis database 38. If the other-user search axis database 38 receives the search axis produced on the basis of information associated with one of the user users and supplied from the communication unit 46, the other-user search axis database 38 stores the received search axis. For example, in a case where the music search apparatus 11 is used by a plurality of users, the search axis database 33 stores search axes produced on the basis of information associated with one user, and the other-user search axis database 38 stores search axes produced on the basis of information associated with other users. That is, the search axis database 33 stores search axes produced on the basis of information associated with a user currently using the music search apparatus 11, and the other-user search axis database 38 stores search axes produced on the basis of information associated with other users.

The search axis value calculation unit 39 calculates the value of each piece of music with reference to the search axis supplied from the search axis acquisition unit 37, on the basis of feature values of the music supplied from the feature value database 32. The search axis value calculation unit 39 calculates the value of each piece of music owned by other users with reference to the search axis supplied from the search axis acquisition unit 37, on the basis of feature values of the music supplied from the other-user feature value database 40.

The search axis value calculation unit 39 supplies the calculated value of each piece of music with reference to the search axis to the music selection unit 41 or the display 45.

The other-user feature value database 40 stores feature values of music owned by other users. More specifically, for example, the other-user feature value database 40 stores metadata as feature values of music owned by other users.

For example, the other-user feature value database 40 stores feature values of music owned by the user of the music search apparatus 11. In a case where the music search apparatus 11 is used by a plurality of users, the other-user feature value database 40 stores feature values of music owned by one or more uses other than a user who is currently using the music search apparatus 11.

More specifically, for example, if the communication unit 46 receives feature values of music of another user from another music search apparatus 11 or the server 12 via the network 13, these received feature values of music are supplied to the other-user feature value database 40, and the other-user feature value database 40 stores the feature values of music supplied from the communication unit 46.

The music selection unit 41 selects music as contents within a particular range from the presented set of pieces of music. For example, the music selection unit 41 selects music within ranges of two search axes from presented music whose feature values are displayed with respect to the two search axes.

In a case where feature values of music are displayed with respect to the search axis produced on the basis of information associated with the user and a search axis produced on the basis of information associated with one of other users, the music selection unit 41 selects music within a particular range of the search axis produced on the basis of information associated with the user and also within a particular range of the search axis produced on the basis of information associated with the one of other users.

More specifically, the music selection unit 41 selects music whose feature values are within a range, specified by the user via the operation unit 36, with respect to a search axis.

The content playback unit 42 reads music content data selected by the music selection unit 41 from the content database 43 and plays the music according to the read music content data.

The content database 43 stores music content data owned by the user. Each music content data stored in the content database 43 is related to corresponding metadata indicating its feature value stored in the feature value database 32 via ID information identifying music.

The search axis comparison unit 44 acquires the search axis produced on the basis of information associated with the user from the search axis database 33 and also acquires the search axis produced on the basis of information associated with the other user from the other-user search axis database 38, and the search axis comparison unit 44 compares the search axis produced on the basis of information associated with the user with the search axis produced on the basis of information associated with the other user. More specifically, for example, the search axis comparison unit 44 compares the similarity between the search axis produced on the basis of information associated with the user with the search axis produced on the basis of information associated with the other user.

Further specifically, the search axis comparison unit 44 calculates the similarity between values of respective pieces of music with reference to the search axis produced on the basis of information associated with user and values of respective pieces of music with reference to the search axis produced on the basis of information associated with the one of the other users, and the search axis comparison unit 44 employs the resultant similarity as the similarity between the search axis produced on the basis of information associated with the user and the search axis produced on the basis of information associated with the one of the other users.

More specifically, the search axis comparison unit 44 reads metadata of each piece of music owned by the user from the feature value database 32 and calculates the value of each piece of music with reference to the search axis produced on the basis of information associated with the user from the metadata of each piece of music. The search axis comparison unit 44 further calculates the value of each piece of music with reference to the search axis produced on the basis of information associated with the one of the other users. The search axis comparison unit 44 then calculates the similarity between the values of respective pieces of music with reference to the search axis produced on the basis of information associated with user and the values of respective pieces of music with reference to the search axis produced on the basis of information associated with the one of the other users, and the search axis comparison unit 44 employs the resultant similarity as the similarity between the search axis produced on the basis of information associated with the user and the search axis produced on the basis of information associated with the one of the other users.

More specifically, for example, the search axis comparison unit 44 calculates the similarity between a search axis determined on the basis of metadata representing the feature values of respective pieces of music and the history of playback of music performed by the user or the evaluations on the respective pieces of music given by the user and a search axis determined on the basis of metadata representing the feature values of respective pieces of music and the history of playback of music performed by the one of the other users or the evaluations on the respective pieces of music given by the one of the other users.

The display 45 includes a LCD (Liquid Crystal Display) or an organic EL (Electro Luminance) display and a display controller adapted to control a displaying operation of the LCD or the organic EL display, and the display 45 functions to display various images or characters under the control of the display controller. More specifically, for example, in accordance with the values of the respective pieces of music with reference to the search axis supplied from the search axis value calculation unit 39, the display 45 displays information associated with the respective pieces of music with reference to the search axis produced on the basis of information associated with the user and a similar search axis produced on the basis of information associated with the one of the other users.

In the displaying of information associated with the respective pieces of music, for example, the display 45 displays an image indicating the search axis produced on the basis of information associated with the user and an image indicating the similar search axis produced on the basis of information associated with one of the other users in a superimposed manner.

That is, the display 45 controls the displaying of information associated with the respective pieces of music with reference to search axes produced by the search axis learning unit 31, or the display 45 controls the displaying of information associated with the respective pieces of music with reference to search axes similar to each other.

If the communication unit 46 receives a search axis (a regression equation or a discriminant) produced on the basis of information associated with one of the other users from another music search apparatus 11 or the server 12 via the network 13, the communication unit 46 transfers the received search axis to the other-user search axis database 38. When the communication unit 46 receives a feature value of a piece of music owned by the one of the other users from another music search apparatus 11 or the server 12 via the network 13, the communication unit 46 transfers the received feature values to the other-user feature value database 40.

The communication unit 46 is capable of reading a search axis of the user from the search axis database 33 and transmitting it to another music search apparatus 11 or the server 12 via the network 13. The communication unit 46 is also capable of reading a feature value of a content of the user from the feature value database 32 and transmitting it to another music search apparatus 11 via the network 13.

As described above, the music search apparatus 11 produces personalized search axes for use in searching for music. The produced search axes are allowed to be used by a plurality of users.

Producing of search axes is explained in further detail below.

The music search apparatus 11 produces search axes used in searching for music, from the history of playback of music performed by the user or feedback values indicating evaluations on music given by the user.

An example of a produced search axis is a search axis indicating the preference level of the user for respective pieces of music or indicating whether the user likes or dislikes respective pieces of music. Another example is a search axis indicating the playback frequency of respective pieces of music or indicating whether respective pieces of music are played frequently or not.

A still another example is a search axis indicating whether respective pieces of music have been played recently or not. A still another example is a search axis indicating whether respective pieces of music are played by the user on the weekends or weekdays. A still another example is a search axis indicating whether respective pieces of music are played by the user in the daytime or nighttime.

Figure 3:
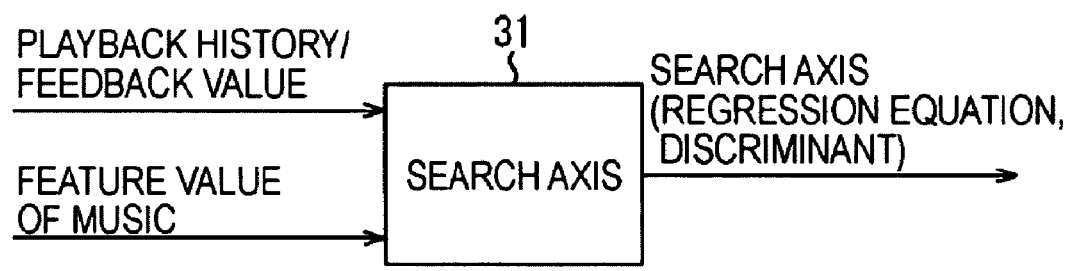
FIG. 3 is a diagram provided for an explanation of producing a search axis by a search axis learning unit.

As shown in FIG. 3, produces search axes via learning of the regression equation or the discriminants according to which to calculate the value of each piece of music with respect to the search axes as a function of the feature values of each piece of music, on the basis of the feature values of the respective pieces of music and the history of playback of music or the feedback values, using statistical analysis or a machine learning technique.

The value of an arbitrary piece of music can be determined by applying the produced regression equation or the discriminant to the feature value of this piece of music. Thus, it is possible to calculate the value with respect to the search axis even for music which has not yet been played or whose feedback value has not yet been input, and it is possible to present such music according to the calculated value with respect to the search axis.

That is, even in a case where only some of all pieces of music owned by the user have been played or feedback values have been input for only some pieces of music, it is possible to determine the values of any piece of music using the regression equation or the discriminant determined on the playback history or the feedback values for particular pieces of music.

Because it is possible to determine the value with respect to the search axis from metadata according to the regression equation or the discriminant for an arbitrary piece of music regardless of whether this piece of music has been played or a feedback value thereof has been input, it is possible to search for any piece of music on the basis of the search axis.

FIG. 4 shows an example of a set of feature values and a feedback value of each piece of music, from which a search axis indicating the preference level for each piece of music is produced. In this example, the feedback value indicates one of 5 preference levels for each piece of music, and each feature value of music is given as metadata.

The user inputs one of five values as a feedback value for each piece of music via the operation unit 36 to indicate how the user does or does not like the music. That is, the feedback value indicates the evaluation of each piece of music given by the user. As described above, the feedback values used for the above purpose are stored in the playback history/feedback database 35.

In the example shown in FIG. 4, the feedback value in terms of preference is 5 for music #1 (that is, the user likes music #1 very much), 3 for music #2 (that is, neutral in preference for music #2), and 2 for music #3 (that is, the user dislikes music #2).

In the example shown in FIG. 4, the music #1 is 24 in a feature value #1, 74 in a feature value #2, and 68 in a feature value #3. The music #2 is 17 in a feature value #1, 81 in a feature value #2, and 50 in a feature value #3. The music #1 is 33 in a feature value #1, 75 in a feature value #2, and 97 in a feature value #3.

The search axis learning unit 31 performs learning in terms of the regression equation on the basis of feedback values in terms of preference and feature values of music such as those shown in FIG. 4.

The learning on the regression equation may be performed using a linear regression method (a multiple regression method) or a SVR (Support Vector Regression) method.

Via the learning described above, determined is the regression equation such as F(feature values of music)=feature value #1×0.5+feature value #2×0.2−feature value #3×0.9+ . . . +0.3 on the basis of which to calculate the value of the search axis indicating the preference level. By applying this regression equation to feature values of music, it is possible to determine the value of the search axis indicating the preference level for the music.

FIG. 5 shows another example of a set of feature values and a feedback value of each piece of music, from which a search axis indicating the preference level for each piece of music is produced. In this example, the feedback value has one of two levels indicating high preference or low preference.

The user inputs a feedback value for each piece of music via the operation unit 36 to indicate whether the user does or does not like the music.

In the example shown in FIG. 5, the feedback value indicating the preference level for each piece of music has one of two values one of which indicates that the user likes a piece of music of interest and the other indicates that the user does not like the piece of music of interest.

In the example shown in FIG. 5, the feedback value for the music #1 has a value indicating that the user likes this music #1. The feedback value for the music #2 also has the value indicating that the user likes this music #2. However, the feedback value for the music #3 also has a value indicating that the user does not like this music #3.

In the example shown in FIG. 5, the music #1 is 24 in a feature value #1, 74 in a feature value #2, and 68 in a feature value #3. The music #2 is 17 in a feature value #1, 81 in a feature value #2, and 50 in a feature value #3. The music #3 is 33 in a feature value #1, 75 in a feature value #2, and 97 in a feature value #3.

The search axis learning unit 31 performs learning in terms of the discriminant on the basis of feedback values in terms of preference and feature values of respective pieces of music such as those shown in FIG. 5.

The learning of the discriminant may be performed using linear discriminant analysis, decision tree analysis, SVM (Support Vector Machine) analysis, or Naive Bayes analysis.

For example, a linear discriminant function is determined as F(feature values of music)=feature value #1×0.5+feature value #2×0.2−feature value #3×0.9+ . . . +0.3. In this case, if F(feature values of music)≧0.0 for a particular piece of music, it is determined that the user likes this piece of music. However, if F(feature values of music)<0.0, it is determined that the user does not like this piece of music. That is, the discriminant function is used to determine whether the user does or does not like a particular piece of music. By applying the discriminant function to feature values of a particular piece of music, it is possible to determine the value of the search axis indicating whether the user does or does not like each piece of music.

By determining the regression equation or discriminant via the learning using metadata indicating feature values of respective pieces of music, it is possible to calculate the value of the search axis for each piece of music by applying the determined regression equation or discriminant to the metadata of each piece of music.

The user is allowed to create an arbitrary search axis by inputting, to the music search apparatus 11, a name of the search axis and inputting levels or feedback values with respect to the search axis for each of some pieces of music.

The regression equation or discriminant may be in a linear form or a non-linear form.

Next, searching for music using a search axis is described below.

To search for music using a produced search axis, the value of the search axis is first calculated for all pieces of music owned by the user.

For example, as shown in FIG. 6, if the regression equation of the search axis indicating the preference level is applied to feature values of music #1, i.e., a feature value #1 of 24, a feature value #2 of 74, and a feature value #3 of 68, 0.3 is obtained as the value of the search axis for the music #1. If the regression equation of the search axis indicating the playback frequency is applied to the feature values #1, #2, and #3 of music #1, 0.2 is obtained as the value of the search axis for the music #1. Similarly, if the regression equation of the search axis indicating the frequency of playback in the morning is applied to the feature values #1, #2, and #3 of music #1, 0.1 is obtained as the value of the search axis for the music #1.

Similarly, as shown in FIG. 6, if the regression equation of the search axis indicating the preference level is applied to feature values of music #2, i.e., 17 as the feature value #1, 81 as the feature value #2, and the 50 as the feature value #3, 0.8 is obtained as the value of the search axis for the music #2. If the regression equation of the search axis indicating the playback frequency is applied to the feature values #1, #2, and #3 of music #2, 0.9 is obtained as the value of the search axis for the music #2. Similarly, if the regression equation of the search axis indicating the frequency of playback in the morning is applied to the feature values #1, #2, and #3 of music #2, 0.7 is obtained as the value of the search axis for the music #2.

Furthermore, as shown in FIG. 6, if the regression equation of the search axis indicating the preference level is applied to feature values of music #3, i.e., 33 as the feature value #1, 75 as the feature value #2, and the 97 as the feature value #3, 0.4 is obtained as the value of the search axis for the music #3. If the regression equation of the search axis indicating the playback frequency is applied to the feature values #1, #2, and #3 of music #3, 0.3 is obtained as the value of the search axis for the music #3. Similarly, if the regression equation of the search axis indicating the frequency of playback in the morning is applied to the feature values #1, #2, and #3 of music #3, 0.1 is obtained as the value of the search axis for the music #3.

From the values of the respective search axes for respective pieces of music, it is possible to search for particular pieces of music having values of the search axes within specified ranges. For example, it is possible to search for music having a value equal to or greater than 0.5 for the search axis indicating the preference level, a value equal to or smaller than 0.4 for the search axis indicating the playback frequency, and a value equal to or greater than 0.2 for the search axis indicating the frequency of playback in the morning.

For example, as shown in FIG. 7, if the discriminant of the search axis indicating whether the user does or does not like a particular piece of music is applied to feature values of music #1, i.e., a feature value #1 of 24, a feature value #2 of 74, and a feature value #3 of 68, a value "like" indicating that the user likes this music #1 is obtained as the value of the search axis for the music #1. If the discriminant of the search axis indicating whether the user does or does not listen to a particular piece of music frequently is applied to feature values #1, #2, and #3 of the music #1, a value "Yes" indicating that the user listens to this music #1 frequently is obtained as the value of the search axis for the music #1. Similarly, if the discriminant of the search axis indicating whether the user does or does not listen to a particular piece of music in the morning is applied to feature values #1, #2, and #3 of the music #1, a value "No" indicating that the user does not listen to this music #1 in the morning is obtained as the value of the search axis for the music #1.

If the user requests the music search apparatus 11 to search for music the user likes, the music search apparatus 11 searches for music having "like" as the value of the search axis indicating whether the user does or does not like music of interest, and presents pieces of music detected as the result of the search to the user.

Similarly, as shown in FIG. 7, if the discriminant of the search axis indicating whether the user does or does not like music of interest is applied to feature values of music #2, i.e., a feature value #1 of 17, a feature value #2 of 81, and a feature value #3 of 50, "like" is obtained as the value of the search axis for the music #2. If the discriminant of the search axis indicating whether the user listens to music of interest frequently or not is applied to feature values #1, #2, and #3 of the music #2, "Yes" is obtained as the value of the search axis for the music #2. If the discriminant of the search axis indicating whether or not the user listens to music of interest in the morning is applied to feature values #1, #2, and #3 of the music #2, "Yes" indicating that the user listens to this music #2 in the morning is obtained as the value of the search axis for the music #2.

Furthermore, as shown in FIG. 7, if the discriminant of the search axis indicating whether or not the user likes music of interest is applied to feature values of music #3, i.e., a feature value #1 of 33, a feature value #2 of 75, and a feature value #3 of 97, "dislike" indicating that the user dislikes this music #3 is obtained as the value of the search axis for the music #3. If the discriminant of the search axis indicating whether or not the user listens to music of interest frequently is applied to feature values #1, #2, and #3 of the music #3, "No" indicating that the user does not listen to this music #3 frequently is obtained as the value of the search axis for the music #3. If the discriminant of the search axis indicating whether or not the user listens to music of interest in the morning is applied to feature values #1, #2, and #3 of the music #3, "No" is obtained as the value of the search axis for the music #3.

Also in this case, from the values of the respective search axes for respective pieces of music, it is possible to search for particular pieces of music having values of the search axes within specified ranges. That is, it is possible to search for particular pieces of music that does or does not meet a condition with respect to a particular search axis.

For example, it is possible to search for music having "like" as the value of the search axis as to whether the user likes music of interest. It is also possible, for example, to search for music having "No" as the value of the search axis as to whether the user listens to music of interest frequently.

Figure 8:
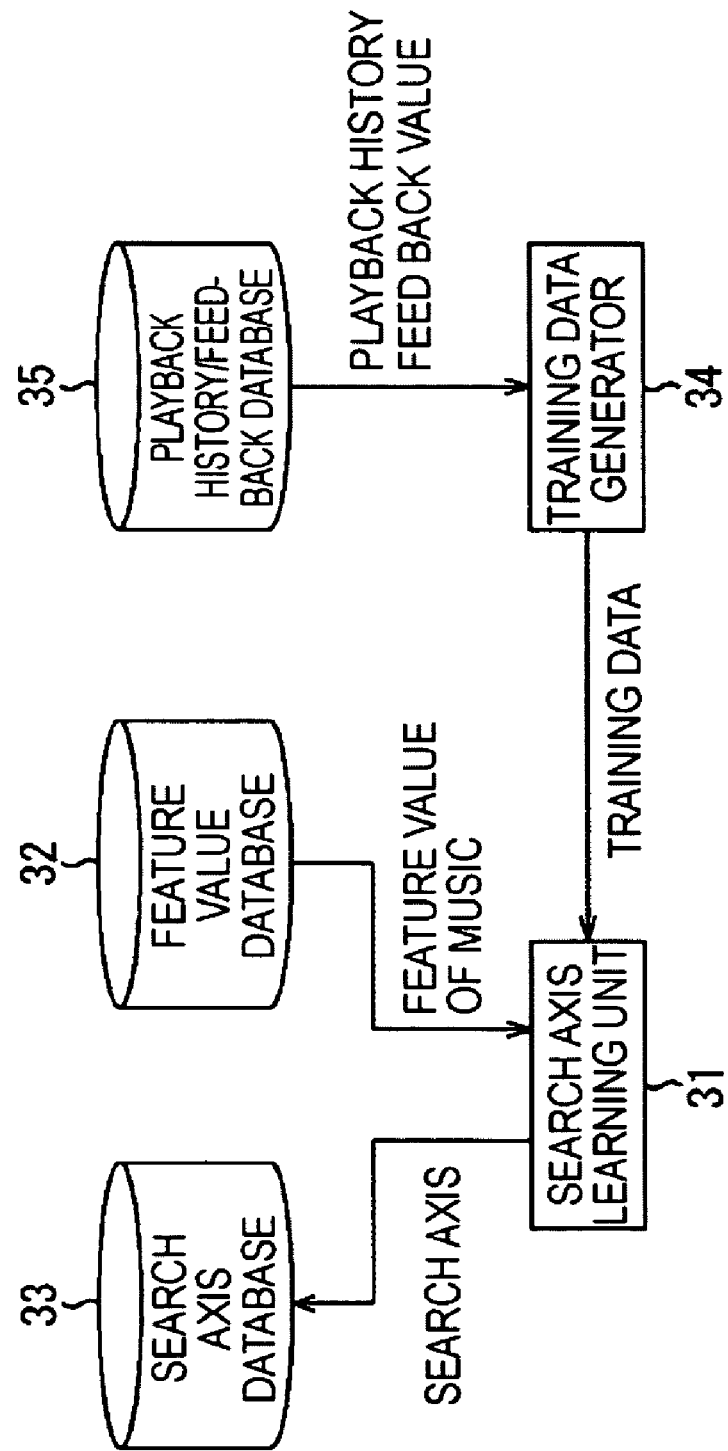
FIG. 8 is a diagram illustrating functional blocks associated with a process of learning search axes.

FIG. 8 is a block diagram illustrating parts associated with learning of search axes, extracted from FIG. 2.

In the learning of a search axis, as shown in FIG. 8, the training data producing unit 34 first acquires a history of playback of music performed by the user or feedback values indicating evaluations of music given by the user from the playback history/feedback database 35.

The training data producing unit 34 removes data unnecessary in learning of the search axis to be produced, from the data as to the history of playback of music performed by the user or feedback values indicating evaluations of music given by the user, thereby producing training data.

The producing of training data is explained in further detail below, with reference to FIGS. 9 to 12.

FIG. 9 shows an example of a history of playback of music performed by a user. The history of playback music performed by the user indicates includes data as to a history of playback or playback operations of music performed by the user.

In the example shown in FIG. 9, the history of playback of music indicates that music #1 was played at 14:04 on Sep. 7, 2006, music #2 was played at 14:08 on Sep. 7, 2006, music #3 was played at 14:13 on Sep. 7, 2006, music #3 was skipped at 14:15 on Sep. 7, 2006, music #4 was played at 14:15 on Sep. 7, 2006, and playback of music #4 was stopped at 14:18 on Sep. 7, 2006.

FIG. 10 shows an example of a set of feedback values indicating evaluations of some pieces of music given by a user. The feedback values indicate evaluation values explicitly given by the user. That is, the feedback values indicate explicit evaluation values for respective pieces of music given by the user.

Items of feedback values are set by the user. In the example shown in FIG. 10, feedback values set by the user include feedback values indicating whether respective pieces of music are interest or not, feedback values indicating whether respective pieces of music are for use by parents or not, and feedback values indicating whether respective pieces of music are old or not.

In the example shown in FIG. 10, 5 is given as the feedback value for music #1 as to whether the user likes or dislikes music to indicate that the user likes this music #1, 3 is given as the feedback value for music #2 to indicate that the preference of the user is neutral, 1 is given as the feedback value for music #4 to indicate that the user dislike music #4 very much, 5 is given as the feedback value for music #5 to indicate that the user likes music #5 very much, and 4 is given as the feedback value for music #6 to indicate that the user rather likes music #6.

In the example shown in FIG. 10, no value is given for music #3 as to whether or not the user likes this music.

In the example shown in FIG. 10, 3 is given for music #1 as the feedback value as to whether music is interest or not to indicate that music #1 was evaluated as being rather interest, 1 is given for music #2 as the feedback value as to this item to indicate that music #2 was evaluated as being very boring, 5 is given for music #3 as the feedback value as to this item to indicate that music #3 was evaluated as being very interesting, and 4 is given for music #6 as the feedback value as to this item to indicate that music #6 was evaluated as being interesting.

In the example shown in FIG. 10, no value is given for music #4 and music #5 as to whether music is interest.

In the example shown in FIG. 10, 1 is given for music #1 as the feedback value as to whether music is good for use by parents to indicate that music #1 was evaluated as being very bad, 2 is given for music #2 as the feedback value as to this item to indicate that music #2 was evaluated as being not very good, 5 is given for music #4 as the feedback value as to this item to indicate that music #4 was evaluated as being good, and 1 is given for music #5 as the feedback value as to this item to indicate that music #5 was evaluated as being very bad.

In the example shown in FIG. 10, no value is given for music #3 and music #6 as to whether music is good for use by parents.

In the example shown in FIG. 10, 3 is given for music #2 as the feedback value as to whether music is old to indicate that music #2 was evaluated as being rather old, 1 is given for music #3 as the feedback value as to this item to indicate that music #3 was evaluated as being not old at all, 1 is given for music #4 as the feedback value as to this item to indicate that music #4 was evaluated as being not old at all, and 2 is given for music #6 as the feedback value as to this item to indicate that music #6 was evaluated as being a little old.

In the example shown in FIG. 10, no value is given for music #1 and music #5 as to whether music is old or not.

The training data producing unit 34 produces training data from the history of playback of music performed by the user (FIG. 9) or the feedback values (FIG. 10).

FIG. 11 shows an example of a set of training data produced by the training data producing unit 34.

The training data is used to learn the regression equation or the discriminant of search axes. The training data is given in the form of a list of data including, for example, a music ID identifying music and answer data.

In the example shown in FIG. 11, the training data in the form of a list includes a music ID identifying music #1 related to answer data of 5, a music ID identifying music #3 related to answer data of 4, a music ID identifying music #6 related to answer data of 2, a music ID identifying music #12 related to answer data of 3, and a music ID identifying music #16 related to answer data of 1.

In the example of the training data shown in FIG. 11, each answer data indicates a feedback value for a piece of music identified by a music ID related to the answer data, as to whether or not the user likes this piece of music, whether this piece of music is interest or not, whether this piece of music is good or not for use by parents, or whether this piece of music is old or not.

More specifically, for example, when the answer data as to whether the user likes music of interest has a value of 5, the answer data indicates that the user likes very much a piece of music identified by a music ID related to the answer data. The answer data having a value of 4 indicates that the user rather likes a piece of music identified by a music ID related to this answer data. The answer data having a value of 3 indicates that the user has neutral preference rather likes a piece of music identified by a music ID related to this answer data. The answer data having a value of 2 indicates that the user rather dislikes a piece of music identified by a music ID related to this answer data. The answer data having a value of 1 indicates that the user dislikes very much a piece of music identified by a music ID related to this answer data.

For example, the training data producing unit 34 extracts a feedback value of one of items and a corresponding music ID for each piece of music from the list shown in FIG. 10. The training data producing unit 34 then removes data having a undefined feedback value from the extracted set of data. Furthermore, the training data producing unit 34 employs the feedback value as answer data for each corresponding music ID thereby producing training data.

Figure 12:
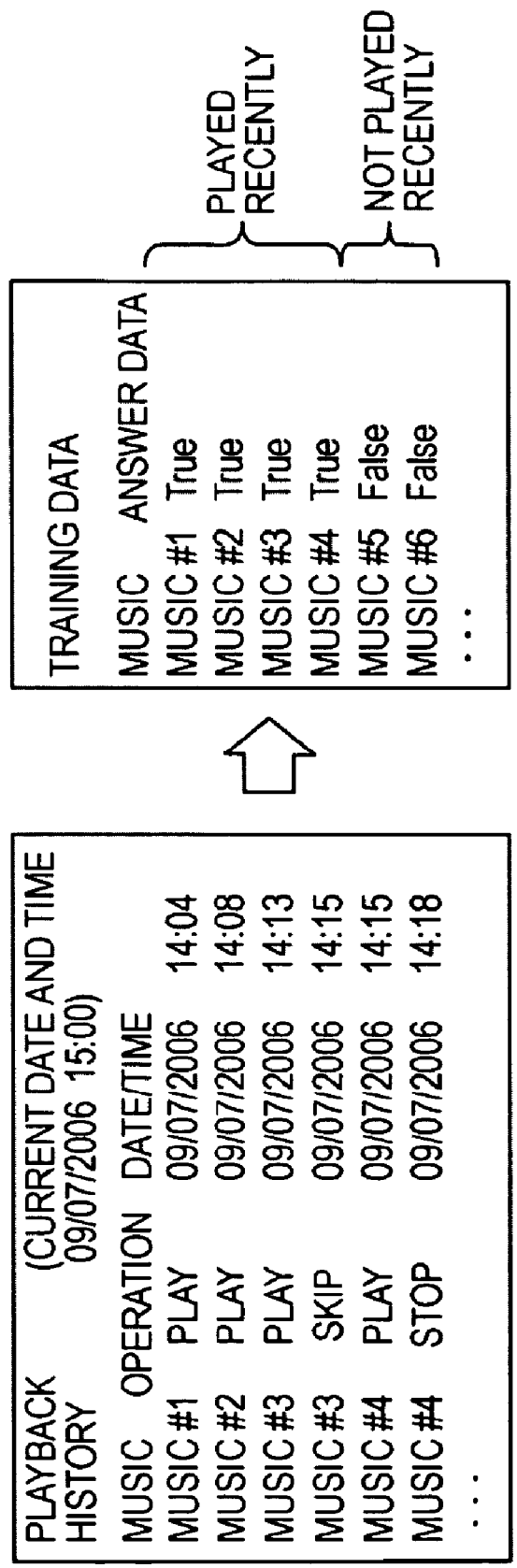
FIG. 12 shows an example of a process of producing training data from a history of playback of music performed by a user.

Referring to FIG. 12, an example of a process of producing training data from a history of playback of music performed by a user is described below.

The training data producing unit 34 produces training data in the form of a list of data including music IDs identifying respective pieces of music and answer data indicating whether the respective pieces of music identified by music IDs have been played back recently, from the history of playback of music by the user.

In the example shown in FIG. 9, a history as of 15:00 on Sep. 7, 2006 indicates that music #1 was played at 14:04 on Sep. 7, 2006, music #2 was played at 14:08 on Sep. 7, 2006, music #3 was played at 14:13 on Sep. 7, 2006, music #3 was skipped at 14:15 on Sep. 7, 2006, music #4 was played at 14:15 on Sep. 7, 2006, and playback of music #4 was stopped at 14:18 on Sep. 7, 2006. From the history of playback of music performed by the user, the training data producing unit 34 produces training data in the form of a list in which a music ID identifying music #1 is related to answer data (True) indicating that the music #1 has been played recently, a music ID identifying music #2 is related to answer data (True) indicating that the music #2 has been played recently, a music ID identifying music #3 is related to answer data (True) indicating that the music #3 has been played recently, a music ID identifying music #4 is related to answer data (True) indicating that the music #4 has been played recently, a music ID identifying music #5 is related to answer data (True) indicating that the music #5 has not been played recently, and a music ID identifying music #6 is related to answer data (True) indicating that the music #6 has not been played recently.

Training data such as that shown in FIG. 12 is produced, for example, when a search axis is produced in terms of whether or not music has been played recently.

Referring again to FIG. 8, the training data producing unit 34 supplies the produced training data to the search axis learning unit 31.

The search axis learning unit 31 acquires feature values of respective pieces of music from the feature value database 32 and performs learning in terms of the regression equation or the discriminant using the training data and the feature values of the respective pieces of music.

Figure 13:
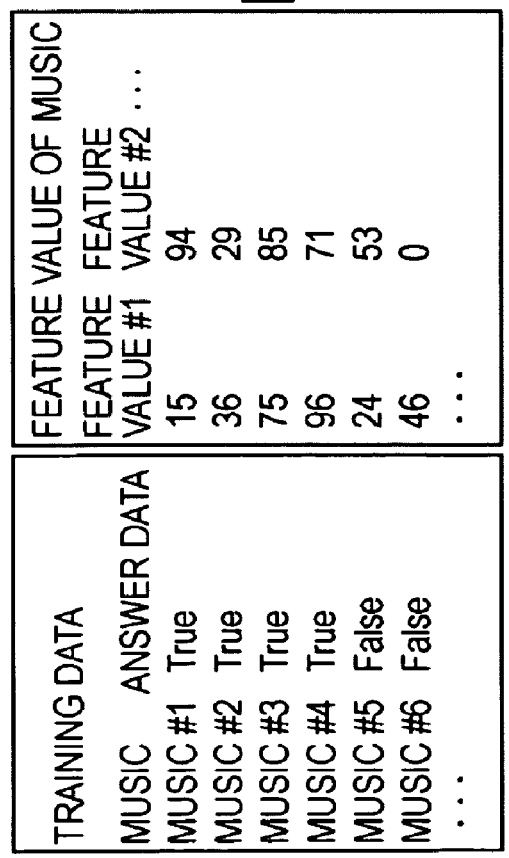
FIG. 13 shows an example of a process of learning a search axis.

For example, as shown in FIG. 13, the search axis learning unit 31 performs learning of the discriminant (equations (1), (2), and (3) shown below) of the search axis in terms of whether the user likes or dislikes respective pieces of music, from the training data in the form of the list in which the music ID identifying music #1 is related to answer data (True) indicating that the user likes the music #1, the music ID identifying music #2 is related to answer data (True) indicating that the user likes the music #2, the music ID identifying music #3 is related to answer data (True) indicating that the user likes the music #3, the music ID identifying music #4 is related to answer data (True) indicating that the user likes the music #4, the music ID identifying music #5 is related to answer data False) indicating that the user does not like the music #5, and the music ID identifying music #6 is related to answer data (False) indicating that the user does not like the music #6, and also the feature values of the respective pieces of music, i.e., a feature value #1 of 15 and a feature value #2 of 94 of music #1, a feature value #1 of 36 and a feature value #2 of 29 of music #2, a feature value #1of 75 and a feature value #2 of 85 of music #3, a feature value #1 of 96 and a feature value #2 of 71 of music #4, a feature value #1 of 24 and a feature value #2 of 53 of music #5, and a feature value #1 of 15 and a feature value #2 of 94 of music #1.

$$F(\text{feature value of music}) = \text{feature value } \#1 \times 0.5 + \text{feature value } \#2 \times 0.2 - \text{feature value } \#3 \times 0.9 + \ldots + 0.3 \quad (1)$$

$$F(\text{feature value of music}) \geq 0.0 \rightarrow \text{Yes} \quad (2)$$

$$F(\text{feature value of music}) < 0.0 \rightarrow \text{No} \quad (3)$$

Equation (2) indicates that if F(feature value of music) determined for a particular piece of music according to equation (1) is equal to or greater than 0, then it is determined that the user likes this piece of music. Equation (3) indicates that if F(feature value of music) determined for a particular piece of music according to equation (1) is smaller than 0, then it is determined that the user dislikes this piece of music.

As described above, from the feature values of music and the history of playback of music performed by the user or the evaluations of music given by the user, the search axis learning unit 31 determines, via the learning, the regression equation or the discriminant by which to calculate the value of the search axis as a function of the feature values of music.

The search axis learning unit 31 supplies the produced search axis to the search axis database 33. The search axis database 33 stores the search axis supplied from the search axis learning unit 31. More specifically, the search axis learning unit 31 supplies the produced regression equation or discriminant to the search axis database 33, and the search axis database 33 stores the received regression equation or discriminant.

Figure 14:
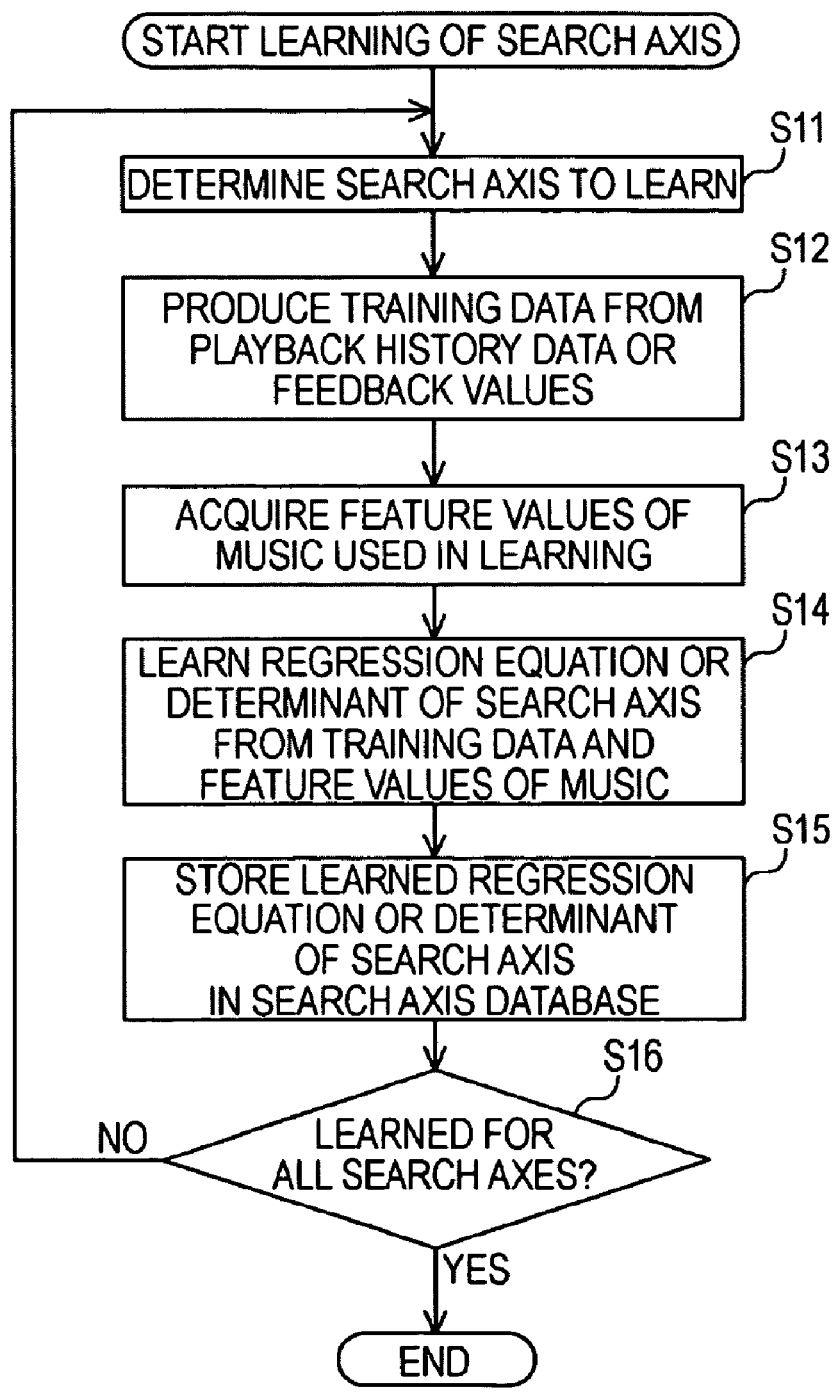
FIG. 14 is a flow chart illustrating a learning process as to a search axis.

FIG. 14 is a flow chart illustrating a learning process as to the search axis. In step S11, the search axis learning unit 31 determines which one of the search axes should be subjected to the learning. For example, the search axis learning unit 31 selects, as one to be subjected to the learning, a search axis indicated by a signal supplied from the operation unit 36 according to an operation performed by the user.

In step S12, the training data producing unit 34 produces training data from the history of playback of music performed by a user or feedback values indicating evaluations on music given by the user. More specifically, the training data producing unit 34 acquires the history of playback of music performed by the user and feedback values from the playback history/feedback database 35 and produces the training data including music IDs identifying respective pieces of music and corresponding answer data from the acquired history of playback of music performed by a user or the feedback values.

In step S13, the search axis learning unit 31 acquires the feature values of music to be used in the learning from the feature value database 32.

In step S14, the search axis learning unit 31 performs learning in terms of the regression equation or the discriminant of the search axis determined in step S11, using the training data and the feature values of music. More specifically, for example, the search axis learning unit 31 performs the learning of the discriminant by linear discriminant analysis, decision tree analysis, SVM (Support Vector Machine) analysis, or Naive Bayes analysis, or performs the learning of the regression equation by the linear regression analysis (multiple regression analysis) or the SVR (Support Vector Regression) analysis.

In step S15, the search axis learning unit 31 stores the regression equation or the discriminant of the search axis obtained via the learning in the search axis database 33.

In step S16, the search axis learning unit 31 determines whether the learning is completed for all search axes. If it is determined that the learning is not completed for all search axes, the processing flow returns to step S11 to repeat the above-described process from step S11.

If it is determined in step S16 that the learning is completed for all search axes, the learning process as to the search axes is ended.

The music search apparatus 11 performs the learning in the above-described manner as to axes used as references on the basis of which to present contents.

That is, the music search apparatus 11 is capable of performing learning as to search axes, produced on the basis of information associated with the user, for use as references on the basis of which to present music. The music search apparatus 11 is also capable of performing learning as to search axes, produced on the basis of feature values of contents and the history of playback of contents performed by the user or the evaluation of contents given by the user, for use as references on the basis of which to present music.

Next, searching for music using search axes is explained below.

Figure 15:
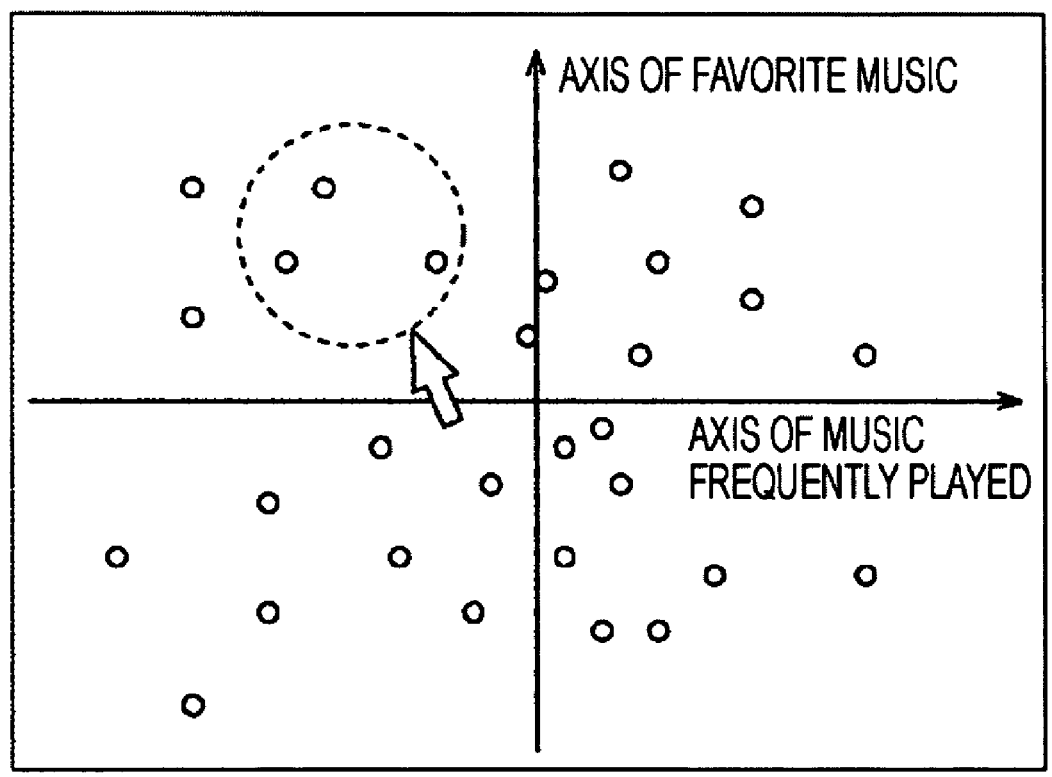
FIG. 15 is a diagram illustrating an example of a user interface in which pieces of music are mapped in a space defined by two search axes.

As shown in FIG. 15, the search axes represented by the regression equation are employed as axes extending in a two or more dimensional space, and a plurality of pieces of music are mapped in this space so as to provide a user interface that allows a user to visually perform searching. Herein, the "mapping of music into the space" refers to a process of calculating the value of each search axis for each piece of music and identifying the location of each piece of music in the space by the calculated value. More specifically, the space is displayed, and the location of each piece of music in the displayed space is indicated by displaying an image such as a circle or a cross or a similar icon at the location in the space.

Such displaying allows the user to easily recognize the location of each piece of music with respect to the two or more axes.

When the location of each piece of music is displayed in the two or more dimensional space having the search axes defined by the regression equation as shown in FIG. 15, it is possible to specify a particular region in this space and search for music having values of the search axes in the specified region. More specifically, for example, if a range of "like" is specified for the search axis as to the preference level and a range of "not frequently played" is for the search axis as to the playback frequency, then pieces of music in a region defined by the above-described two ranges, i.e., pieces of music which are liked by the user but which are not played frequently are searched for.

In the searching for music performed by the music search apparatus 11, not only search axes of the user produced on the basis of the history of playback of music performed by the user or feedback values but also search axes of another user may be used.

For example, the music search apparatus 11 is capable of searching for pieces of music which are liked by the user and which are also liked by Mr. A who is another user. As another example, the music search apparatus 11 is capable of searching for pieces of music which are played by Mr. A in the morning. As still another example, the music search apparatus 11 is capable of searching for pieces of music which are liked by the user and which are often played on weekends by Mr. B who is still another user.

The searching capability described above allows the user to know what is similar to or different from other users in terms of preference.

Figure 16:
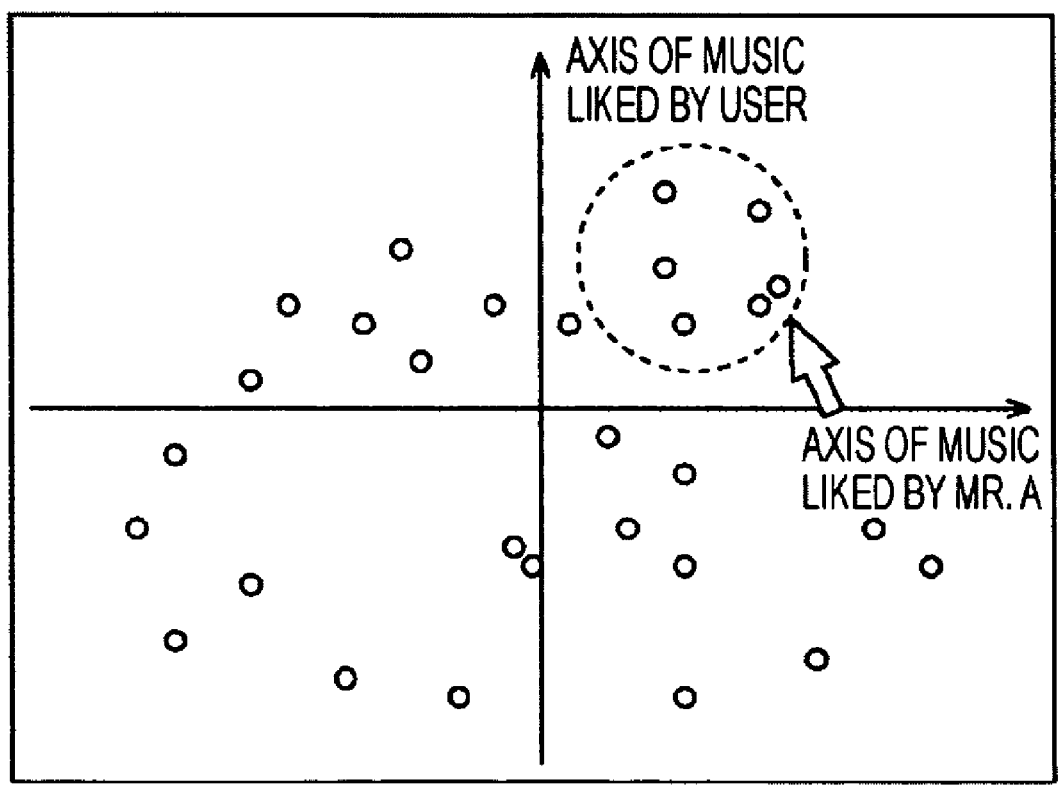
FIG. 16 is a diagram illustrating an example of a user interface in which pieces of music are mapped in a space defined by a search axis of a user and a search axis produced on the basis of information associated with another user.

In this case, for example, as shown in FIG. 16, the space is defined so as to also have a search axis defined by a regression equation determined on the basis of information associated with another user, pieces of music are mapped in this space.

For example, the space is defined so as to have a search axis indicating the preference level of the user and a search axis indicating the preference level of Mr. A who is another user, and pieces of music are mapped in this space. In this case, for example, if a range of "like" is specified for both search axes of the preference levels of the user and Mr. A, then pieces of music which are liked by both the user and Mr. A are searched for.

Figure 17:
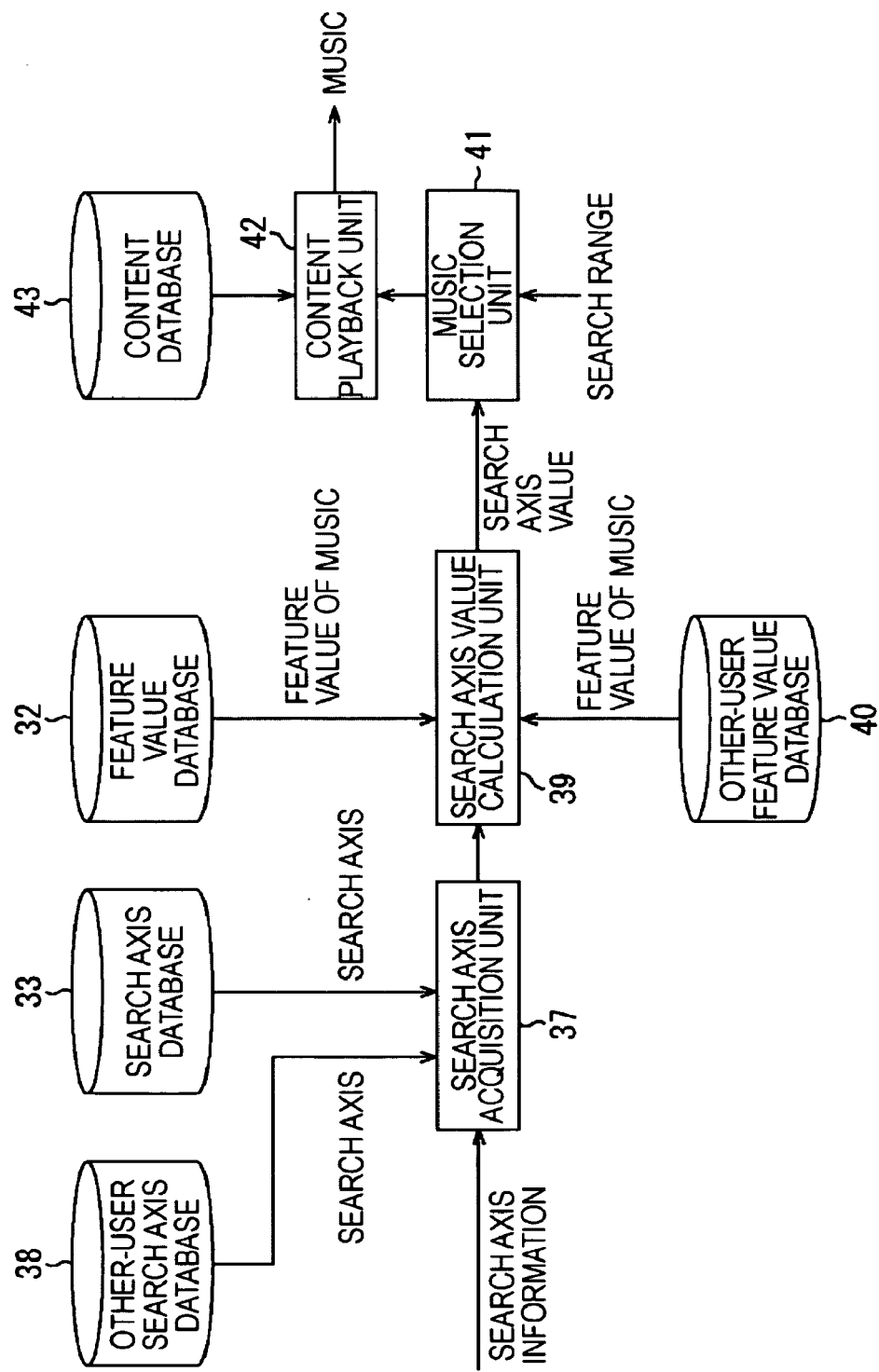
FIG. 17 is a diagram illustrating functional blocks associated with a search process using search axes.

FIG. 17 is a block diagram illustrating parts associated with searching using search axes, extracted from FIG. 2.

In the searching process using search axes, if the user operates the operation unit 36 to specify search axes to be used in the searching, the operation unit 36 supplies search axis information indicating the search axis specified by the user to the search axis acquisition unit 37. As shown in FIG. 17, the search axis acquisition unit 37 acquires the search axis indicated by the search axis information from the search axis database 33 or the other-user search axis database 38.

Figure 18:
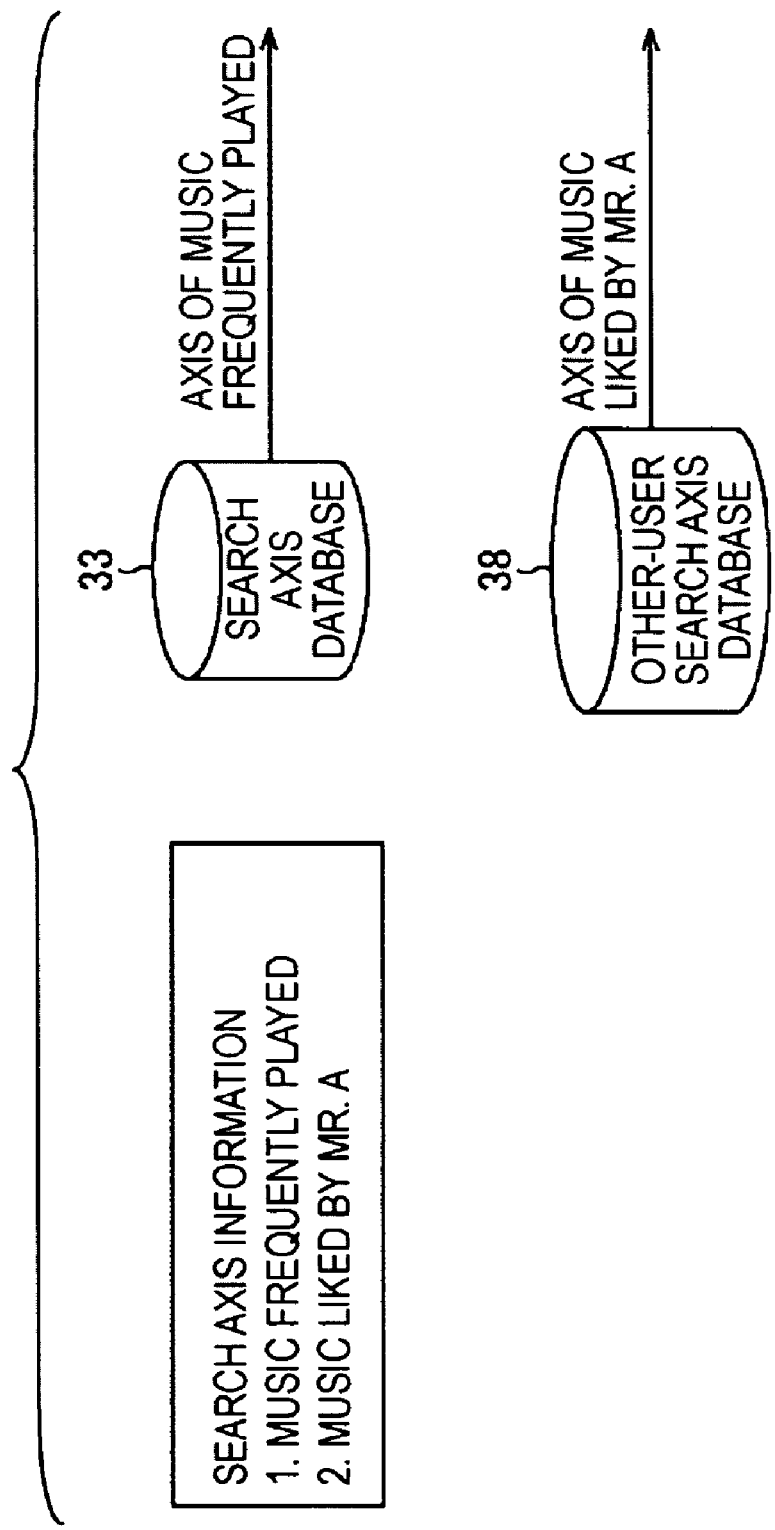
FIG. 18 is a diagram provided for an expiation of acquisition of search axes.

For example, as shown in FIG. 18, the search axis information supplied from the operation unit 36 specifies "frequently played music" and "favorite music of Mr. A", then the search axis acquisition unit 37 acquires a search axis with a name "frequently played music" indicating the preference level of music ("axis of frequently played music" shown in FIG. 18) from the search axis database 33, and also acquires a search axis with a name "favorite music of Mr. A" indicating the preference level of the Mr. A who is one of other users ("axis of favorite music of Mr. A" shown in FIG. 18) from the other-user search axis database 38.

More specifically, in this case, the search axis acquisition unit 37 acquires the regression equation of the search axis with the name "frequently played music" indicating the preference level of music from the search axis database 33, and also acquires the regression equation of the search axis with the name "favorite music of Mr. A" indicating the preference level of the Mr. A who is one of other users from the other-user search axis database 38.

The search axis acquisition unit 37 supplies the acquired search axes to the search axis value calculation unit 39.

The search axis value calculation unit 39 acquires feature values of respective pieces of music owned by the user from the feature value database 32 and also acquires feature values of respective pieces of music owned by one of the other users (Mr. A in this specific case) from the other-user feature value database 40.

From the feature values of the respective pieces of music, the search axis value calculation unit 39 calculates the values in terms of the search axis supplied from the search axis acquisition unit 37.

Figure 19:
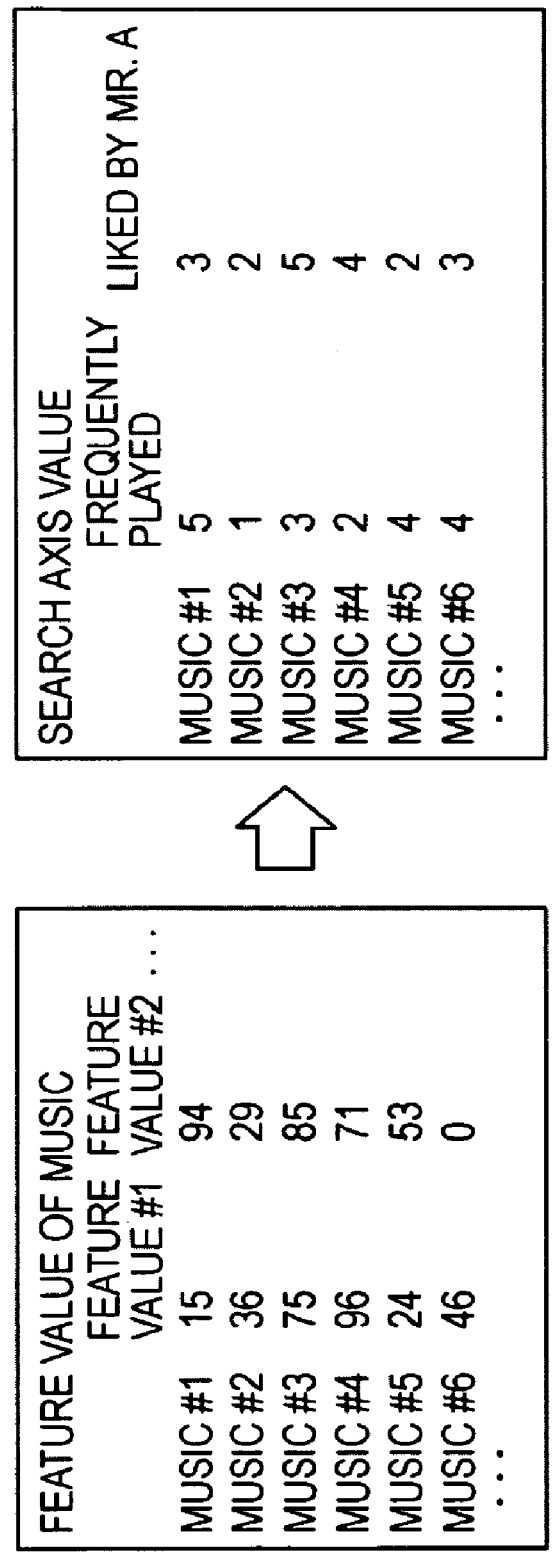
FIG. 19 is a diagram provided for an expiation of calculation of values of search axes.

More specifically, for example, as shown in FIG. 19, the search axis value calculation unit 39 obtains 5 as the value in terms of the search axis as to the playback frequency for music #1 by applying the regression equation of the search axis as to the playback frequency to feature values (more specifically, a feature value #1 of 15 and a feature value #2 of 94) of music #1 and also obtains 3 as the value in terms of the search axis as to the preference level of Mr. A who is one of the other users for music #1 by applying the regression equation of the search axis as to the preference level of Mr. A to the feature values (i.e., 15 as the feature value #1 and 94 as the feature value #2) of music #1.

The search axis value calculation unit 39 obtains 1 as the value in terms of the search axis as to the playback frequency for music #2 by applying the regression equation of the search axis as to the playback frequency to feature values (more specifically, 36 as the feature value #1 and 29 as the feature value #2) of music #2, and also obtains 2 as the value in terms of the search axis as to the preference level of Mr. A who is one of the other users for music #2 by applying the regression equation of the search axis as to the preference level of Mr. A to the feature values (more specifically, 36 as the feature value #1 and 29 as the feature value #2) of music #2.

Similarly, the search axis value calculation unit 39 calculates the values in terms of the search axis as to the playback frequency for music #3 to #6 by applying the regression equation of the search axis as to the playback frequency to feature values of music #3 to #6, and also calculates the values in terms of the search axis as to the preference level of Mr. A who is one of the other users for music #3 to #6 by applying the regression equation of the search axis as to the preference level of Mr. A to the feature values of music #3 to #6.

The search axis value calculation unit 39 supplies the calculated values of respective pieces of music with reference to each search axis to the music selection unit 41.

On the basis of the supplied values of the respective pieces of music in terms of the respective search axes, the music selection unit 41 selects music having feature values satisfying the specified search condition.

Figure 20:
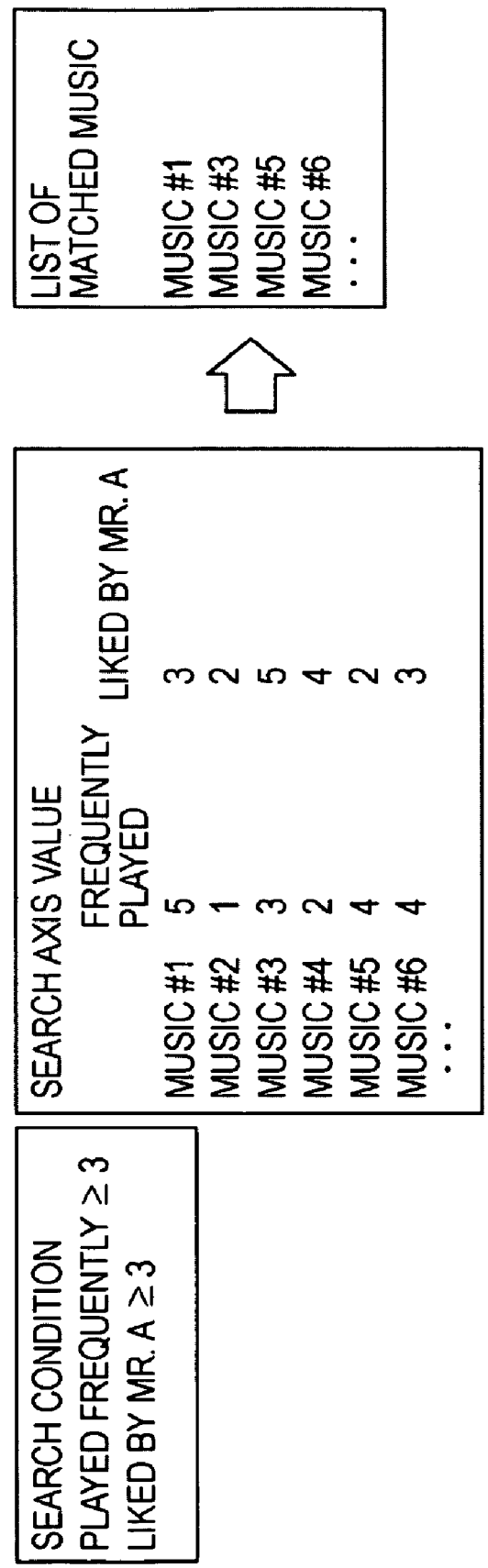
FIG. 20 is a diagram provided for an expiation of selection of particular pieces of music.

For example, as shown in FIG. 20, if the search condition given from the operation unit 36 specifies that the value in terms of the search axis indicating the playback frequency should be equal to or greater than 3 and the value in terms of the search axis indicating the preference level of Mr. A who is one of the other users should be equal to or greater than 3, and if the values of music #1 to #6 in terms of the search axis indicating the playback frequency are respectively 5, 1, 3, 2, 4, and 4, and the values of music #1 to #6 in terms of the search axis indicating the preference level of Mr. A who is one of the other users are respectively 3, 2, 5, 4, 2, and 3, then the music selection unit 41 selects music #1, music #3, music #5, and music #6 which are equal to or greater than 3 in the value indicating the playback frequency and equal to or greater than 3 in the value indicating the preference level of Mr. A who is one of the other users.

The music selection unit 41 outputs a list of selected pieces of music to the content playback unit 42. The list of selected pieces of music output from the music selection unit 41 may be in the form of a playlist indicating music to be played.

The content playback unit 42 reads data of the music included in the list of selected music supplied from the music selection unit 41 from the content database 43 and plays the music according to the read data.

Figure 21:
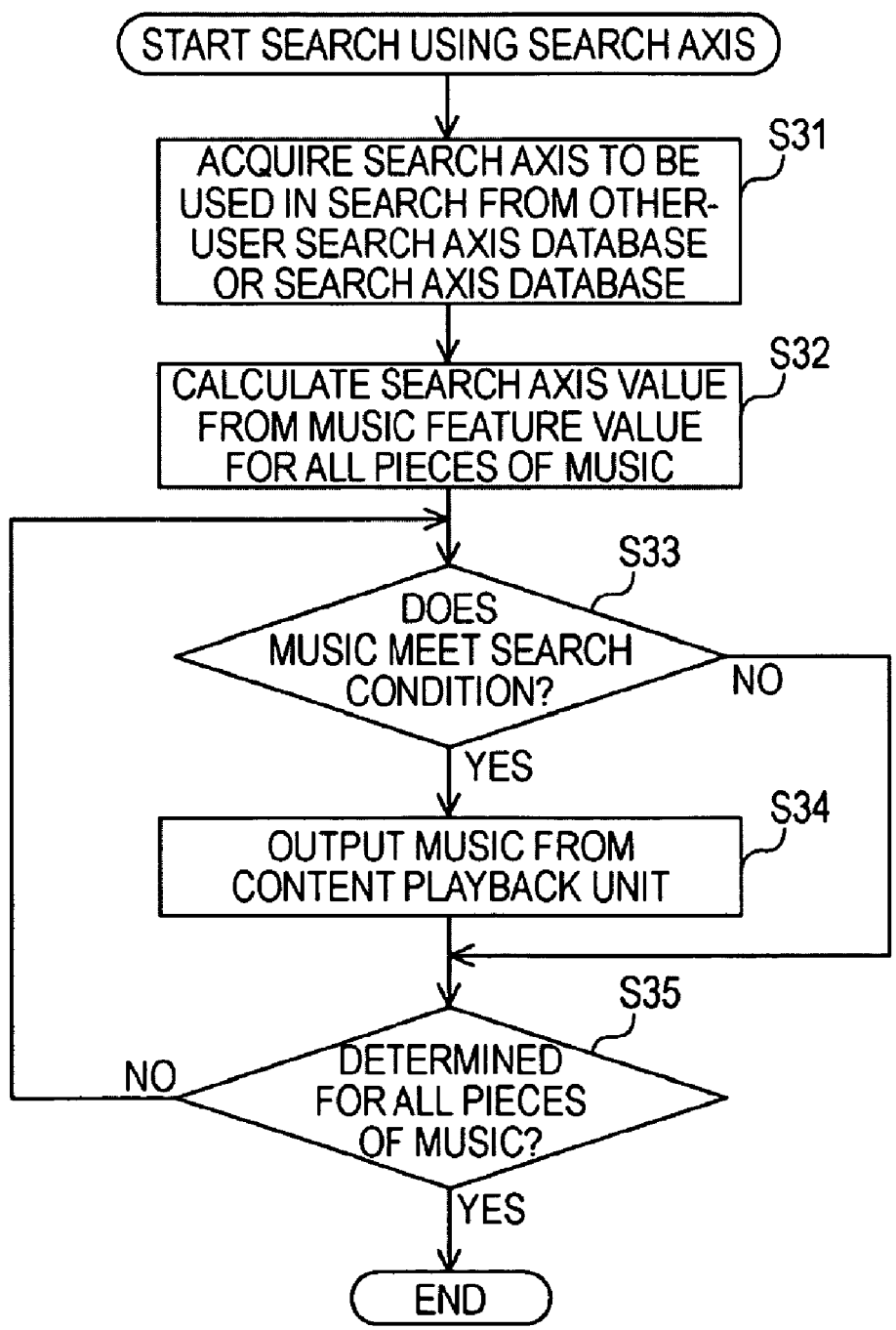
FIG. 21 is a flow chart illustrating a searching process using search axes.

FIG. 21 is a flow chart illustrating a searching process using search axes. In step S31, the search axis acquisition unit 37 acquires the search axes to be used in the searching, from the search axis database 33 or the other-user search axis database 38. More specifically, for example, the search axis acquisition unit 37 acquires the regression equation or the discriminant of the search axes to be used-in the searching, from the search axis database 33 or the other-user search axis database 38.

For example, in step S31 described above, the search axis acquisition unit 37 acquires one of the two search axes to be used in the searching from the search axis database 33 and the other one of the two from the other-user search axis database 38.

In step S32, the search axis value calculation unit 39 acquires feature values of the respective pieces of music owned by the user from the feature value database 32 and also acquires feature values of the respective pieces of music owned by one of the other users from the other-user feature value database 40. The search axis value calculation unit 39 then calculates the value for each piece of music in terms of each search axis from the acquired feature values. More specifically, for example, the search axis value calculation unit 39 calculates the values for respective pieces of music in terms of the respective search axes by applying the regression equation or the discriminant of each search axis to the feature values of each piece of music.

Alternatively, after the search axis acquisition unit 37 acquires, in step S31, one of the two search axes to be used in the searching from the search axis database 33 and the other one of the two from the other-user search axis database 38, the search axis value calculation unit 39 may acquire, in step S32, only feature values of the respective pieces of music owned by the user from the feature value database 32 and may calculate the values for all pieces of music in terms of each search axis from the acquired feature values. This allows the user to know the values in terms of the search axis of user and the search axis of one of the other users for the pieces of music owned by the user.

Conversely, after the search axis acquisition unit 37 acquires, in step S31, one of the two search axes to be used in the searching from the search axis database 33 and the other one of the two from the other-user search axis database 38, the search axis value calculation unit 39 may acquire, in step S32, only feature values of the respective pieces of music owned by one of the other users the user from the other-user feature value database 40, and may calculate the values for all pieces of music in terms of each search axis from the acquired feature values. This allows the user to know the values in terms of the search axis of user and the search axis of one of the other users for the pieces of music owned by one of the other users.

In step S33, the music selection unit 41 determines where a current piece of music satisfies the specified search condition, by evaluating the value of the current piece of music in terms of the search axis used in the searching with respect to the specified search condition.

If it is determined in step S33 that the current piece of music satisfies the specified search condition, the processing flow proceeds to step S34. In step S34, the music selection unit 41 instructs the content playback unit 42 to play the piece of music determined as satisfying the search condition.

The process then proceeds to step S35. In step S34 described above, the content playback unit 42 reads data of the piece of music determined as satisfying the search condition from the content database 43 and plays the music in accordance with the read data.

In a case where the piece of music determined as satisfying the search condition is owned by the one of the other users, the playback of the music is not performed. In this case, data of the piece of music determined as satisfying the search condition may be acquired from the server 12 via the network 13 and playback may be performed in accordance with the acquired data.

On the other hand, in a case where it is determined in step S33 that the current piece of music does not satisfy the search condition, step S34 is skipped and the processing flow proceeds to step S35.

In step S35, the music selection unit 41 determines whether the determination is completed for all pieces of music. If it is determined that the determination is not completed for all pieces of music, the processing flow returns to step S33 to repeat the above-described process for a next piece of music.

In a case where it is determined in step S35 that the determination is completed for all pieces of music, the search process using the search axes is ended.

The similarity between a search axis produced on the basis of information associated with the user and a search axis produced on the basis of information associated with one of the other users may be calculated, and contents may be presented on the basis of a plurality of similar search axes.

The similarity of search axes is determined by calculating the values in terms of each search axis for all pieces of music owned by the user and calculating the similarity of the calculated values among search axes. That is, the search axis comparison unit 44 calculates the value in terms of each search axis for each of all pieces of music owned by the user, and further calculates the similarity among the values of the respective search axes. The resultant similarity is employed as the similarity among the search axes.

The presentation of contents based on a plurality of similar search axes is explained in further detail below. First, an explanation is provided for a case where the values in terms of each search axis is calculated using the regression equation of the search axis.

Figure 22:
FIG. 22 is a diagram provided for an expiation of calculation of similarity of search axes.

In the calculation of the similarity of search axes, when the user has a total of eight pieces of music (music #1 to music #8) as shown in FIG. 22, the value is determined first for each piece of music (music #1 to music #8) in terms of a first search axis indicating the preference level produced on the basis of information associated with the user and then the value is determined in terms of a search axis indicating the playback frequency produced on the basis of information associated with one of the other users.

As shown in FIG. 22, the values of music #1 to music #8 in terms of the search axis indicating the preference level are respectively 0.5, 0.4, 0.1, 0.2, 0.4, 0.3, 0.2, and 0.5. These values are calculated by applying the regression equation of the search axis indicating the preference level to the feature values of each of the eight pieces of music #1 to #8.

The values of music #1 to music #8 in terms of the search axis indicating the playback frequency are respectively 0.2, 0.5, 0.4, 0.1, 0.2, 0.5, 0.2, and 0.4. These values are calculated by applying the regression equation of the search axis indicating the playback frequency to the feature values of each of the eight pieces of music #1 to #8.

To determine the similarity between these two search axes, the correlation coefficient between the values of music #1 to #8 in terms of the search axis indicating the preference level and the values of music #1 to #8 in terms of the search axis indicating the preference level.

More specifically, for example, the correlation coefficient between a preference vector including eight values of respective pieces of music (music #1 to music #8) in terms of the search axis indicating the preference level and a preference vector including eight values of respective pieces of music (music #1 to music #8) in terms of the search axis indicating the preference level is calculated, and the resultant correlation coefficient is employed as the value indicating the similarity between the search axis indicating the preference level and the search axis indicating the playback frequency.

For example, if the correlation coefficient between the preference vector and the playback frequency vector is calculated as 0.1, then the similarity between the search axis indicating the preference level and the search axis indicating the playback frequency is determined as 0.1.

Next, the presentation of contents is explained for a case where the values in terms of each search axis is calculated using the discriminant of the search axis.

Figure 23:
FIG. 23 is a diagram provided for an expiation of calculation of similarity of search axes.

In this case, in the calculation of the similarity of search axes, when the user has a total of eight pieces of music (music #1 to music #8) as shown in FIG. 23, the value is determined first for each piece of music (music #1 to music #8) in terms of a first search axis indicating whether the user likes or dislikes music on the basis of information associated with the user, and then the value is determined in terms of a search axis indicating whether music is played frequently or not on the basis of information associated with one of the other users.

In the example shown in FIG. 23, the values of the respective pieces of music #1 to #8 in terms of the search axis indicating whether the user likes or dislikes music are Yes, Yes, No, No, Yes, No, No, and Yes. These values are calculated by applying the discriminant of the search axis indicating whether the user likes or dislikes music to the feature values of each of the eight pieces of music #1 to #8.

The values of the respective pieces of music #1 to #8 in terms of the search axis indicating whether music is played frequently or not are No, Yes, Yes, No, No, Yes, No, and Yes. These values are calculated by applying the discriminant of the search axis indicating whether music is played frequently or not to the feature values of each of the eight pieces of music #1 to #8.

The similarity ratio between the values of the respective pieces of music #1 to #8 in terms of the search axis indicating whether the user likes or dislikes music and the values in terms of the search axis indicating whether music is played frequently or not, and the resultant similarity ratio is used as a value indicating the similarity of search axes. For example, the similarity ratio is given by dividing the number of pieces of music which are equal in the values of the search axis by the total number of pieces of music subjected to the comparison in terms of the value of the search axis.

More specifically, the value of music #1 in terms of the search axis indicating whether the user likes or dislikes this music is Yes, and the value of music #1 in terms of the search axis indicating whether this music is played frequently or not is No, and thus the values of these two search axis for music #1 are not equal. The value of music #2 in terms of the search axis indicating whether the user likes or dislikes this music is Yes, and the value of music #2 in terms of the search axis indicating whether this music is played frequently or not is Yes, and thus the values of these two search axis for music #2 are equal.

In the example shown in FIG. 23, of a total of eight pieces of music (music #1 to music #8), the values of the two search axes are equal to each other for four pieces of music (music #2, music #4, music #7, and music #8), and thus the similarity ratio is 4/8=0.50.

For example, the similarity ratio between a "like" vector including eight values of respective pieces of music (music #1 to music #8) in terms of the search axis indicating whether the user likes or dislikes music and a "frequently played" vector including eight values of respective pieces of music (music #1 to music #8) in terms of the search axis indicating whether music is played frequently is calculated, and the resultant similarity ratio is used as the value of the similarity between the search axis in terms of whether the user likes or dislikes music and the search axis in terms of whether music is played frequently or not.

For example, when the similarity ratio between the "like" vector and the "frequently played" vector is 0.50, the similarity between the search axis in terms of whether the user likes or dislikes music and the search axis in terms of whether music is played frequently or not is determined as 0.50.

In a case where the similarity is determined between a search axis whose value is determined by a regression equation and a search axis whose value is determined by a discriminant, each value of the search axis determined by the regression equation is first converted into two-level value by comparison with a predetermined threshold value, and then the similarity ratio is calculated and the resultant value is employed as the similarity between the two search axes.

Thus, the similarity of search axes is determined by the search axis comparison unit 44 in the above-described manner.

The search axis comparison unit 44 calculates the similarity between each of all search axes produced on the basis of information associated with the user and each of all search axes produced on the basis of information associated with one of the other users.

For example, as shown in FIG. 24, each of search axes of the user, including a search axis indicating the preference level, a search axis indicating the playback frequency, a search axis indicating whether music has a good musical sense, and a search axis indicating the wildness level, is compared with each of search axes of one of the other users, including a search axis indicating the preference level, a search axis indicating the playback frequency, a search axis indicating whether music is excellent or not, and a search axis indicating whether music is of consolation or not, and the similarity between each of search axes of the user and each of search axes of one of the other users is calculated.

In the example shown in FIG. 24, the search axis comparison unit 44 calculates the similarity as follows. The similarity between the search axis indicating the preference level determined on the basis of information associated with the user and the search axis indicating the preference level determined on the basis of information associated with one of the other users is calculated as 0.5. The similarity between the search axis indicating the preference level on the basis of information associated with the user and the search axis indicating the playback frequency determined on the basis of information associated with one of the other users is calculated as 0.8. The similarity between the search axis indicating the preference level determined on the basis of information associated with the user and the search axis indicating whether music is excellent or not determined on the basis of information associated with one of the other users is calculated as 0.9. The similarity between the search axis indicating the preference level determined on the basis of information associated with the user and the search axis indicating whether music is of consolation determined on the basis of information associated with one of the other users is calculated as 0.6.

Similarly, the similarity between the search axis indicating the playback frequency determined on the basis of information associated with the user and the respective search axes determined on the basis of information associated with one of the other users, i.e., the search axis indicating the preference level, the search axis indicating the playback frequency, the search axis indicating whether music is excellent or not, and the search axis indicating whether music is of consolation are calculated as 0.4, 0.5, 0.9 and 0.5.

Furthermore, the similarity between the search axis indicating whether music has a good musical sense or not determined on the basis of information associated with the user and the respective search axes determined on the basis of information associated with one of the other users, i.e., the search axis indicating the preference level, a search axis indicating the playback frequency, a search axis indicating whether music is excellent or not, and the search axis indicating whether music is of consolation are calculated as 0.7, 0.6, 0.4, or 0.1.

Furthermore, the similarity between the search axis indicating the wildness level determined on the basis of information associated with the user and the respective search axes determined on the basis of information associated with one of the other users, i.e., the search axis indicating the preference level, a search axis indicating the playback frequency, a search axis indicating whether music is excellent or not, and the search axis indicating whether music is of consolation are calculated as 0.5, 0.9, 0.3, or 0.8.

If the calculation of the similarity of search axes by the search axis comparison unit 44 is completed, the display 45 presents search axes having high similarity to the user.

In a case where the similarity is defined such that higher values indicate that search axes are more similar, a highest similarity value or similarity values greater than a predetermined threshold value are selected from the calculated similarity values of the search axes or a predetermined number of similarity values are selected in the decreasing order starting with the highest similarity value, and the display 45 displays search axes corresponding to the selected similarity values.

More specifically, if the similarity between each pair of search axes is calculated as shown in FIG. 24, a highest similarity value, i.e., 0.9 is selected as shown in FIG. 25, and search axes having the highest similarity value, i.e., the search axis indicating the preference level determined on the basis of information associated with the user and the search axis indicating whether music is excellent or not determined on the basis of information associated with one of the other users are presented as similar search axes to the user.

In a case where Mr. A is another user of interest, a message such as "Music favorite of you is evaluated as being excellent by Mr. A" may be displayed on the display 45.

Furthermore, the search axis indicating the playback frequency determined on the basis of information associated with the user and the search axis indicating whether music of interest is excellent or not determined on the basis of information associated with one of the other users are presented as similar search axes to the user.

The search axis indicating the wildness level determined on the basis of information associated with the user and the search axis indicating the playback frequency determined on the basis of information associated with the one of the other users are also presented as similar search axes to the user.

In a case where Mr. A is another user of interest, a message "Music evaluated as being wild by you is played frequently by Mr. A" may be displayed on the display 45.

The message may be produced by extracting a proper word from the name of the search axis and inserting into a template prepared in advance.

Instead of presenting similar search axes, search axes which are opposite to each other may be selected from the search axes determined on the basis of information associated with user and search axes determined on the basis of information associated with one of the other users, and the selected search axes may be presented to the user. For example, when the similarity of search axes is represented by a positive or negative correlation value, a greatest absolute value is selected from calculated negative similarity values of the search axes, and a search axis corresponding to the selected similarity value may be displayed on the display 45 thereby presenting it to the user.

Alternatively, search axes having no correlation to each other may be selected from the search axes determined on the basis of information associated with user and search axes determined on the basis of information associated with one of the other users, and the selected search axes may be presented to the user. For example, when the similarity of search axes is represented by the correlation value, a smallest absolute value may be selected from the calculated similarity values of the search axes, and a search axis corresponding to the selected similarity value may be displayed on the display 45 thereby presenting it to the user.

Of search axes produced on the basis of information associated with the user and search axes produced on the basis of information associated with one of the other users are displayed on the display 45, search axes similar to each other may be detected and displayed on the display 45. For example, similarity is determined between a search axis indicating the preference level of the user and a search axis indicating the preference level of one of the other users, or a search axis indicating whether music is evaluated as being excellent by the user and a search axis indicating whether music is evaluated as being excellent by one of the other users, and detected similar search axes may be displayed on the display 45.

In the case where search axes determined as being similar to original search axes are additionally displayed on the display 45, they are displayed such that the similar search axes have low intensity and are superimposed on an image with high intensity of the original search axes in the two or more dimensional space defined by the original search axes.

Figure 26:
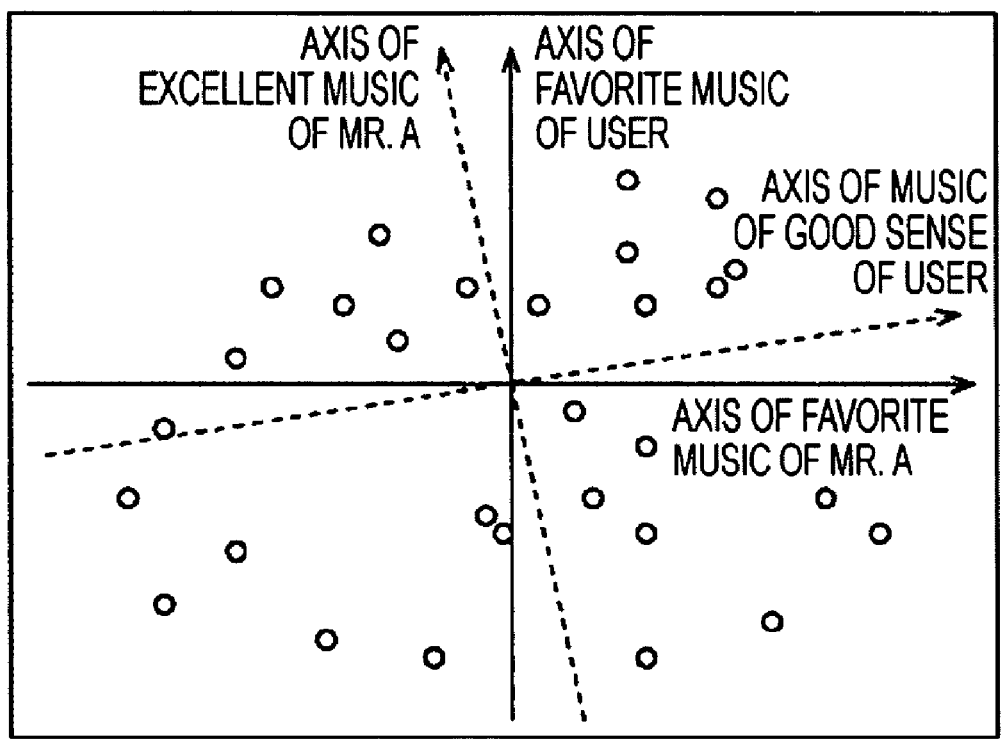
FIG. 26 shows an example of a set of similar search axes displayed in a superimposed manner.

For example, as shown in FIG. 26, a search axis indicating the preference level determined on the basis of information associated with the user and a search axis indicating the preference level determined on the basis of information associated with Mr. A who is one of the other user of interest are displayed by solid lines thereby to define a two-dimensional space on the display 45. In this two-dimensional space, respective pieces of music are plotted by displaying symbols such as open circles on the display 45 at locations corresponding to the values of the search axes indicating the preference level of the user and Mr. A for respective pieces of music.

Furthermore, a search axis indicating whether music is excellent or not determined on the basis of information associated with Mr. A who is one of the other users of interest, which is similar to the search axis indicating the preference level determined on the basis of information associated with the user, is displayed with low intensity in the two-dimensional space on the display 45 as represented by a dotted line in FIG. 26.

Still furthermore, a search axis indicating whether music is of good musical sense or not determined on the user, which is similar to the search axis indicating the preference level determined on the basis of information associated with Mr. A who is one the other users of interest, is displayed with low intensity in the two-dimensional space on the display 45 as represented by a dotted line in FIG. 26.

When an additional search axis, similar to a primary search axis which is one of the search axes defining the two or more dimensional space in which pieces of music are displayed, is displayed, the additional search axis may be tilted from the primary search axis by an angle determined depending on the similarity. For example, in the case where the similarity is given by the correlation value, an additional search axis similar to a primary search axis is tilted from this primary search axis or from an axis perpendicular to this search axis by an angle corresponding to the similarity. More specifically, when the similarity of an additional search axis is calculated as 0.8 in correlation value, the additional search axis is tilted from an axis perpendicular to a primary axis by a gradient of 0.8. In a case where the similarity of an additional search axis is calculated as −0.2 in correlation value, the additional search axis is tilted from a primary axis by a gradient of −0.2. In the case where the similarity has a value in the range from 0 to 1 and greater values indicate higher similarity, an additional search axis is tilted from a corresponding similar primary axis, which is one of the primary axes defining the two or more dimensional space in which pieces of music are displayed, by an angle given by arctan(1—similarity).

As described above, when there is an additional search axis similar to one of the primary search axes defining the two or more dimensional space in which pieces of music are displayed, the additional search axis may be displayed with low intensity in a superimposed manner.

If a user selects a similar search axis, the music search apparatus 11 presents pieces of music meeting the selected search axis.

More specifically, for example, in the case where values in terms of the selected search axis are determined using a regression equation, the music search apparatus 11 selects pieces of music having calculated values in terms of the search axis greater than a predetermined threshold and presents the selected pieces of music to the user in increasing order of the values.

In the case where values in terms of the selected search axis are determined using a discriminant, the music search apparatus 11 presents pieces of music having a predetermined value (Yes or No) in terms of the selected search axis to the user.

Figure 27:
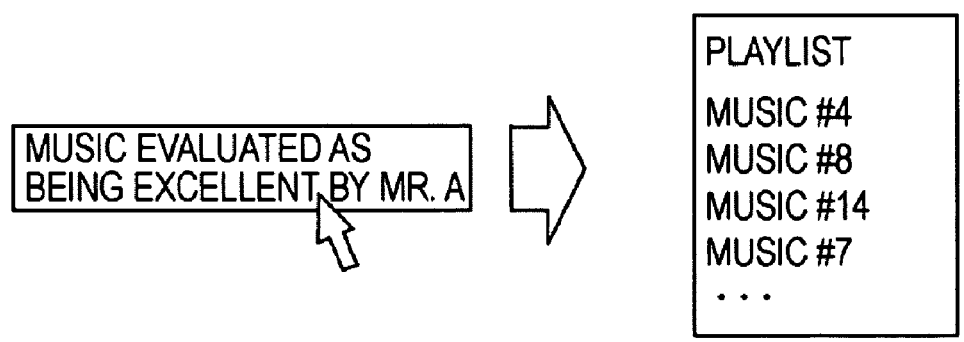
FIG. 27 is a diagram provided for an explanation of an operation of selecting a search axis.

More specifically, for example, as shown in FIG. 27, if the user clicks a button on the operation unit 36 to select one of search axes similar to a particular search axis displayed on the display 45 (for example, if the search axis indicating whether music is excellent or not determined on the basis of information associated with Mr. A who is one of the other users is selected), then the music search apparatus 11 selects pieces of music with respect to the selected search axis (for example, music #4, music #8, music #14, and music #7 evaluated as excellent music are selected) and presents the selected pieces of music to the user. In the presentation of pieces of music meeting the selected search axis to the user, the music search apparatus 11 may present the pieces of music, for example, in the form of a playlist.

Figure 28:
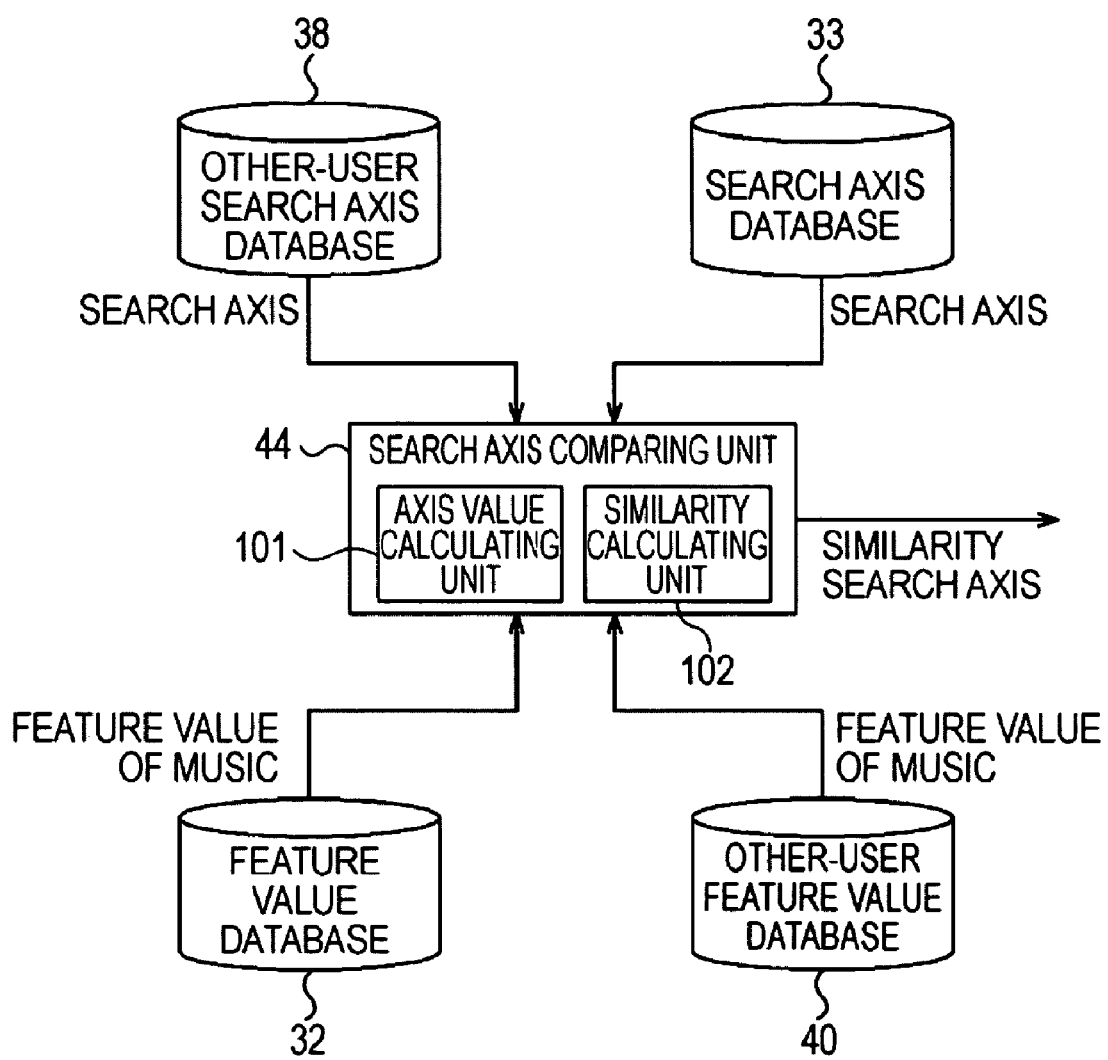
FIG. 28 is a diagram illustrating functional blocks associated with a process of calculating the similarity of search axes.

Of various parts of the music search apparatus shown in FIG. 2, parts associated with the calculation of similarity search axes are extracted and shown in the form of a block diagram in FIG. 28.

The search axis comparison unit 44 includes an axis value calculation unit 101 and a similarity calculation unit 102.

The search axis comparison unit 44 acquires search axes to be subjected to the calculation of similarity from the search axis database 33 or the other-user search axis database 38. More specifically, the search axis comparison unit 44 acquires regression equations or discriminants according to which to calculate values in terms of the search axes subjected to the calculation of similarity from the search axis database 33 or the other-user search axis database 38.

The search axis comparison unit 44 acquires feature values of respective pieces of music owned by the user from the feature value database 32. The axis value calculation unit 101 of the search axis comparison unit 44 calculates the values of respective pieces of music in terms of each search axis by applying the regression equation or the discriminant of each search axis to the feature values of each piece of music.

The similarity calculation unit 102 of the search axis comparison unit 44 calculates the similarity of values in terms of search axes of interest and employs the result as the similarity of the search axes.

Alternatively, the search axis comparison unit 44 may acquire feature values of respective pieces of music owned by one of the other users from the other-user feature value database 40 and may calculate the similarity of search axes from the acquired feature values of respective pieces of music owned by the one of the other users.

Still alternatively, the search axis comparison unit 44 may calculate the similarity of search axes from the feature values of respective pieces of music owned by the user and the feature values of respective pieces of music owned by the one of the other users.

Still alternatively, the search axis comparison unit 44 may calculate the similarity of search axes from the feature values of particular pieces of music selected from those owned by the user and/or those owned by the one of the other users. For example, the search axis comparison unit 44 may calculate the similarity of search axes from a predetermined number of pieces of music selected from the total pieces of music. For example, the search axis comparison unit 44 may calculate the similarity of search axes from a predetermined number of pieces of music randomly selected from the total pieces of music.

The search axis comparison unit 44 determines search axes similar to each other on the basis of the calculated similarity of the search axes and outputs the search axes determined as being similar.

Figure 29:
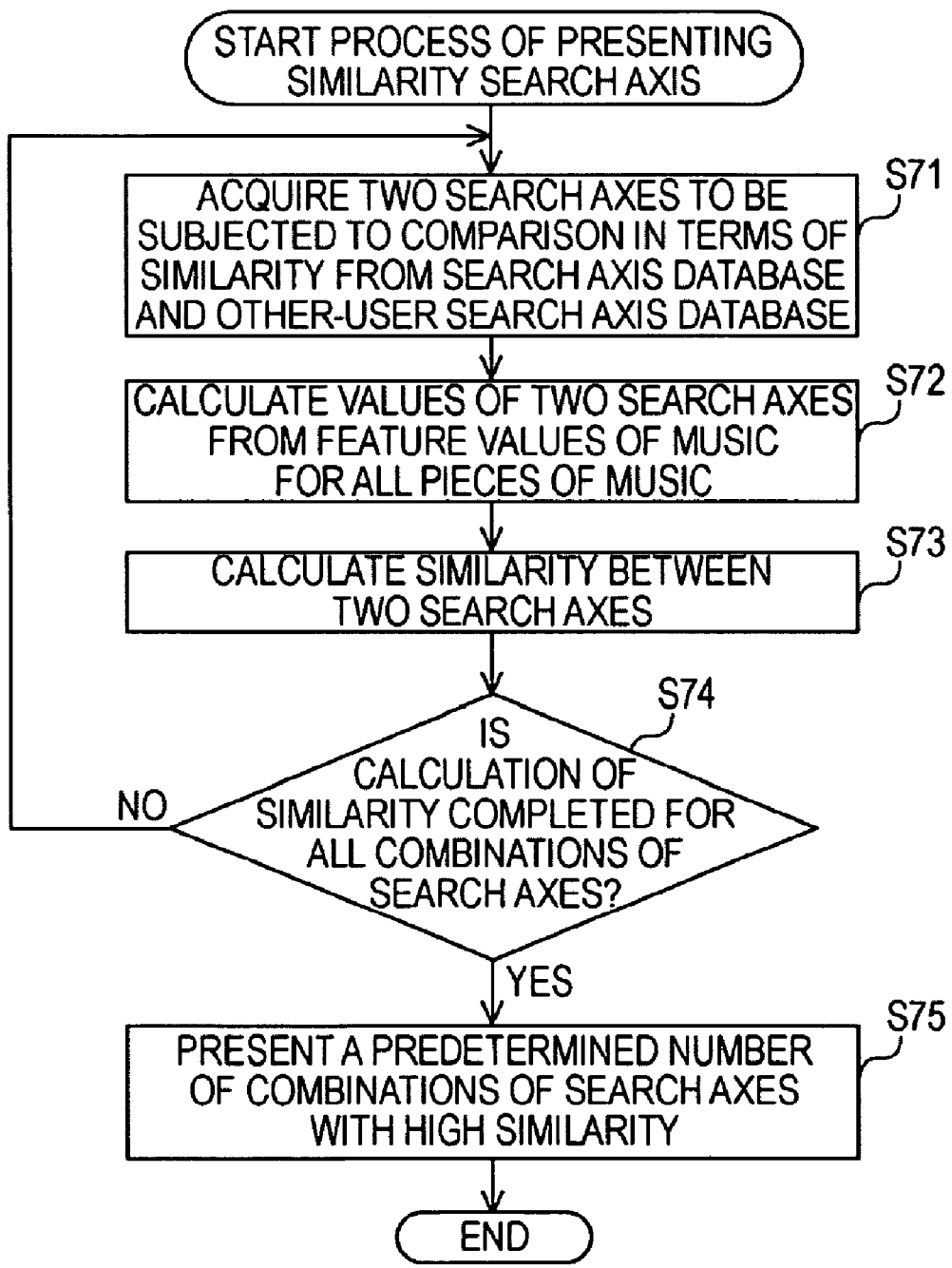
FIG. 29 is a flow chart illustrating a process of presenting search axes having high similarity.

FIG. 29 is a flow chart illustrating a process of presenting search axes having high similarity. In step S71, the search axis comparison unit 44 acquires two search axes to be subjected to the calculation of similarity from the search axis database 33 or the other-user search axis database 38.

In step S72, from the feature values of the respective pieces of music, the search axis comparison unit 44 calculates the values in terms of the two search axes for all pieces of music owned by the user. More specifically, for example, the search axis comparison unit 44 acquires the feature values of all pieces of music owned by the user from the feature value database 32, and the axis value calculation unit 101 of the search axis comparison unit 44 applies the regression equation or the discriminant of each of the two search axis to the feature value of each piece of music to determine the value in terms of each search axis for each of all pieces of music owned by the user.

In step S73, the search axis comparison unit 44 calculates the similarity between the two search axes. More specifically, the similarity calculation unit 102 of the search axis comparison unit 44 calculates the similarity of values in terms of the search axes calculated in step S72 and employs the result as the similarity between the two search axes.

In step S74, the search axis comparison unit 44 determines whether the calculation of similarity is completed for all combinations of two search axes. If it is determined that the calculation of similarity is not completed for all combinations of two search axes, the processing flow returns to step S71 to repeat the above-described process from step S71.

On the other hand, in the case where it is determined in step S74 that the calculation of similarity is completed for all combinations of two search axes, the processing flow proceeds to step S75. In step S75, the display 45 presents a predetermined number of combinations of search axes having highest similarity to the user, and the process of presenting the similar search axes is ended. More specifically, in this step S75, the search axis comparison unit 44 selects a predetermined number of calculated similarity values in decreasing order starting from the highest value, and outputs search axes correspond to the selected similarity values to the display 45. The display 45 displays the search axes having high similarity supplied from the search axis comparison unit 44.

In the presentation of search axes having high similarity, the display 45 may display the names of the search axes having high similarity or may display the search axes with low intensity in a superimposed manner in the two or more dimensional space defined by the primary search axes, as described above with reference to FIG. 26.

Pieces of music owned by the user and pieces of music owned by one of the other users may be plotted in a superimposed manner in the same two or more dimensional space defined by particular search axes, as explained below.

Figure 30:
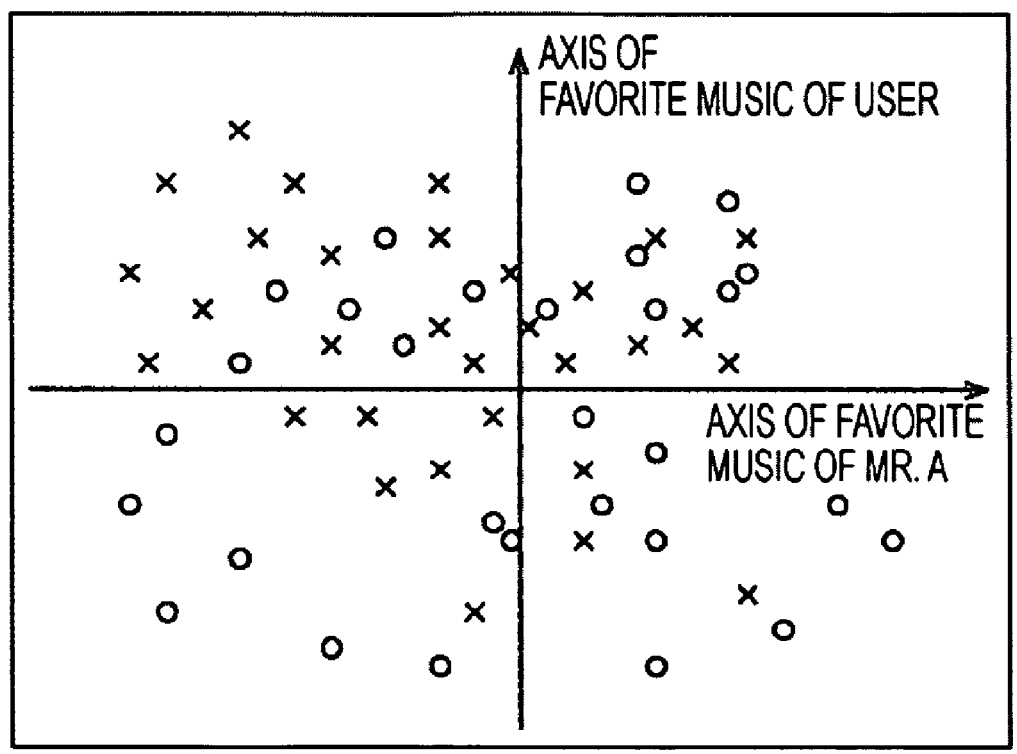
FIG. 30 illustrates an example of a manner in which pieces of music owned by a user and pieces of music owned by another user are displayed in a superimposed manner.

For example, as shown in FIG. 30, pieces of music owned by the user and pieces of music owned by one of the other users (for example, Mr. A) are plotted in a superimposed manner in the same two or more dimensional space defined by the search axis indicating the preference level determined on the basis of information associated with the user and the search axis indicating the preference level determined on the basis of information associated with the one of the other users (for example, Mr. A). In FIG. 30, open circulars denote locations of respective pieces of music owned by the user plotted in the two-dimensional space defined by the two search axes, and crosses denote locations of respective pieces of music owned by Mr. A.

Figure 31:
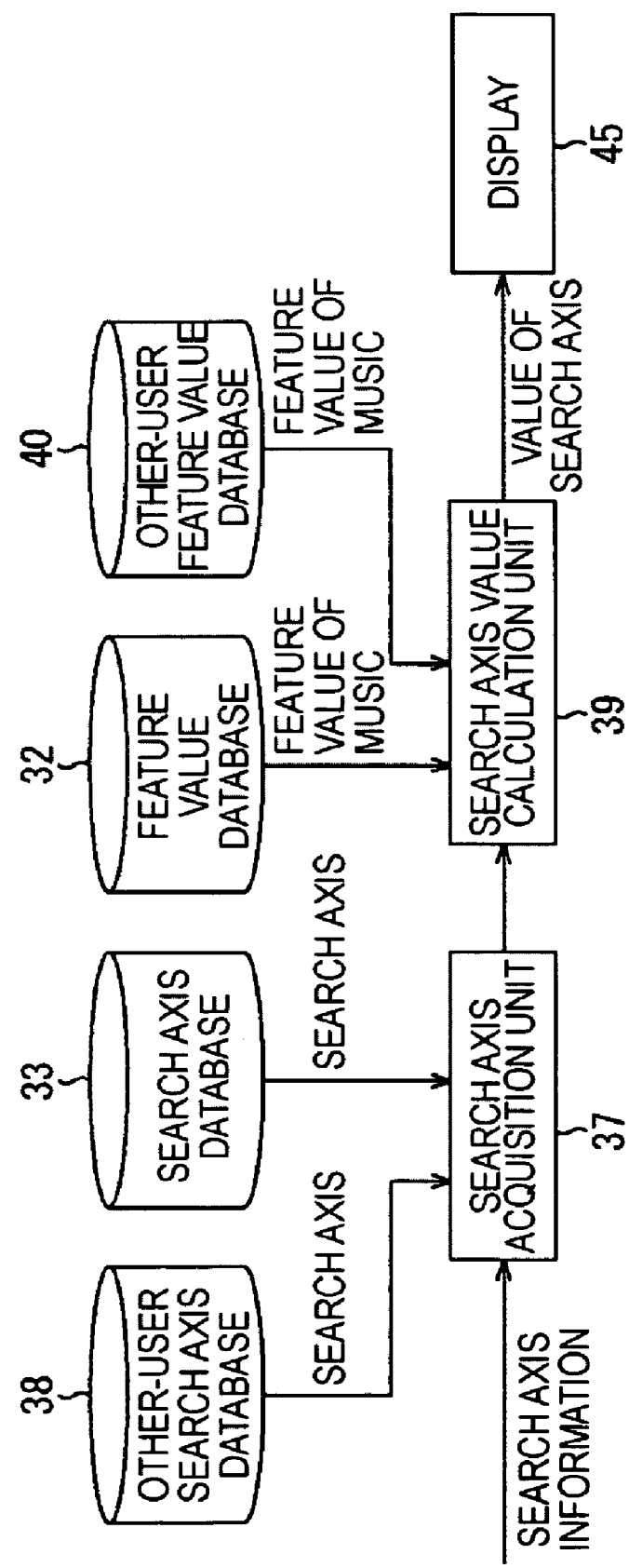
FIG. 31 is a diagram illustrating functional blocks associated with a process of displaying pieces of music owned by a user and pieces of music owned by another user in a two or more dimensional space.

Of various parts of the music search apparatus shown in FIG. 2, parts associated with the displaying of pieces of music owned by the user and pieces of music owned by one of the other users in the superimposed manner in the same two or more dimensional space are shown in the form of a block diagram in FIG. 31.

if a user operates the operation unit 36 to specify a search axis to be used in searching, the operation unit 36 supplies search axis information indicating the search axis to be used in the searching to the search axis acquisition unit 37. In response, the search axis acquisition unit 37 acquires the search axis indicated by the search axis information from the search axis database 33 or the other-user search axis database 38. More specifically, the search axis acquisition unit 37 acquires a regression equation or a discriminant according to which to calculate values in terms of the search axis from the search axis database 33 or the other-user search axis database 38.

Figure 32:
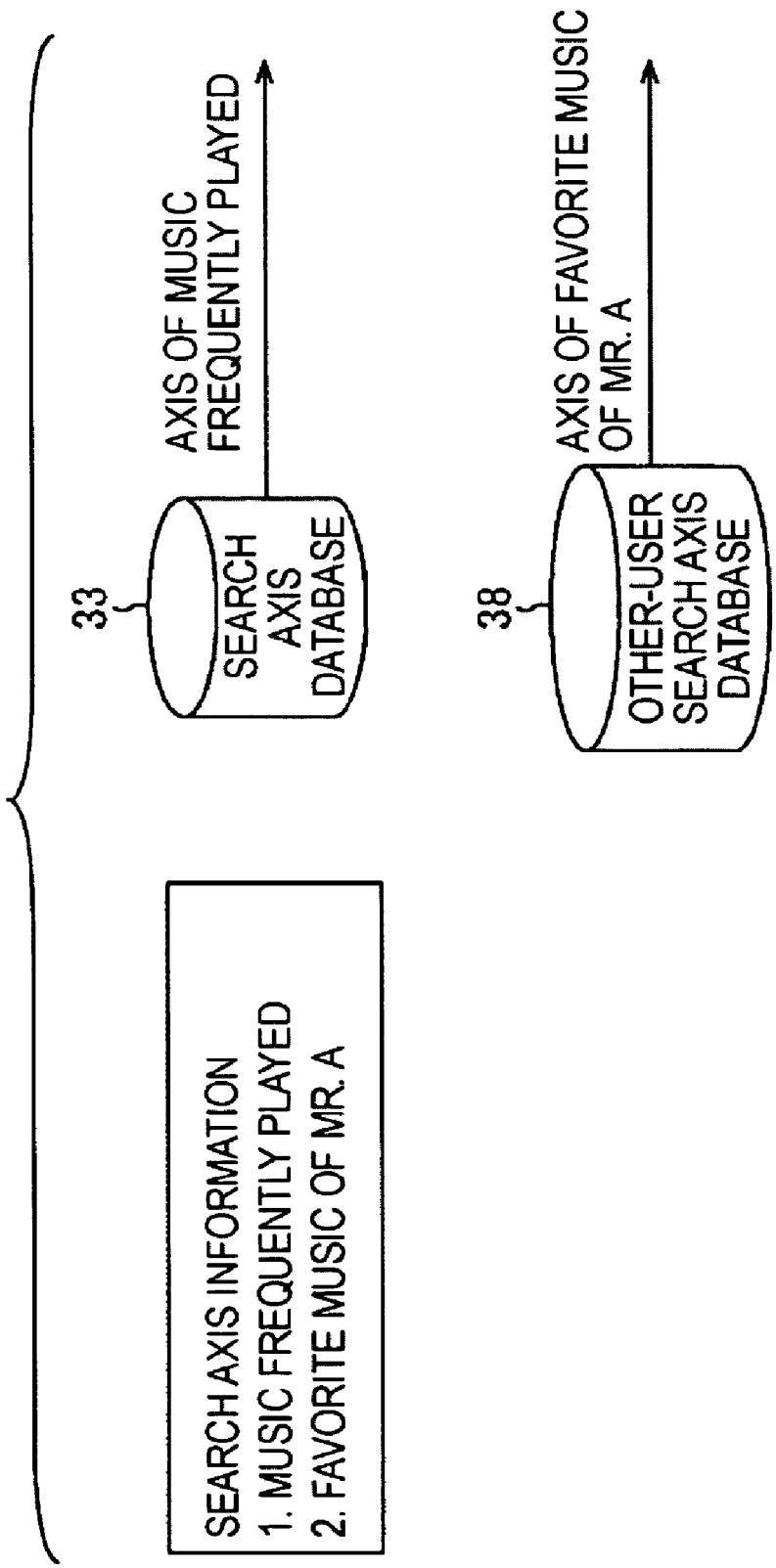
FIG. 32 is a diagram provided for an explanation of acquisition of search axes.

For example, as shown in FIG. 32, in a case where the search axis information supplied from the operation unit 36 specifies "frequently played" and "liked by Mr. A", the search axis acquisition unit 37 acquires a search axis having a name "frequently played" indicating the playback frequency from the search axis database 33, and also acquires a search axis having a name "liked by Mr. A" indicating the preference level of Mr. A from the other-user search axis database 38.

More specifically, in this case, the search axis acquisition unit 37 acquires a regression equation of the search axis having the name "frequently played" indicating the playback frequency from the search axis database 33, and also acquires a regression equation of the search axis having the name "liked by Mr. A" indicating the preference level of Mr. A from the other-user search axis database 38.

The search axis acquisition unit 37 supplies the acquired search axis (more specifically, the regression equation or the discriminant of the search axis) to the search axis value calculation unit 39.

The search axis value calculation unit 39 acquires feature values of respective pieces of music owned by the user from the feature value database 32 and also acquires feature values of respective pieces of music owned by the one of the other users from the other-user feature value database 40. The search axis value calculation unit 39 calculates the value in terms of each search axis for each piece of music by applying the regression equation or the discriminant of the search axis supplied from the search axis acquisition unit 37 to the feature value of each piece of music owned by the user or the one of the other users.

More specifically, the search axis value calculation unit 39 acquires feature values of all pieces of music owned by the user from the feature value database 32 and values of all pieces of music owned by the one of the other users of interest from the other-user feature value database 40, and the search axis value calculation unit 39 calculates the value in terms of each search axis for each piece of music.

Figure 33:
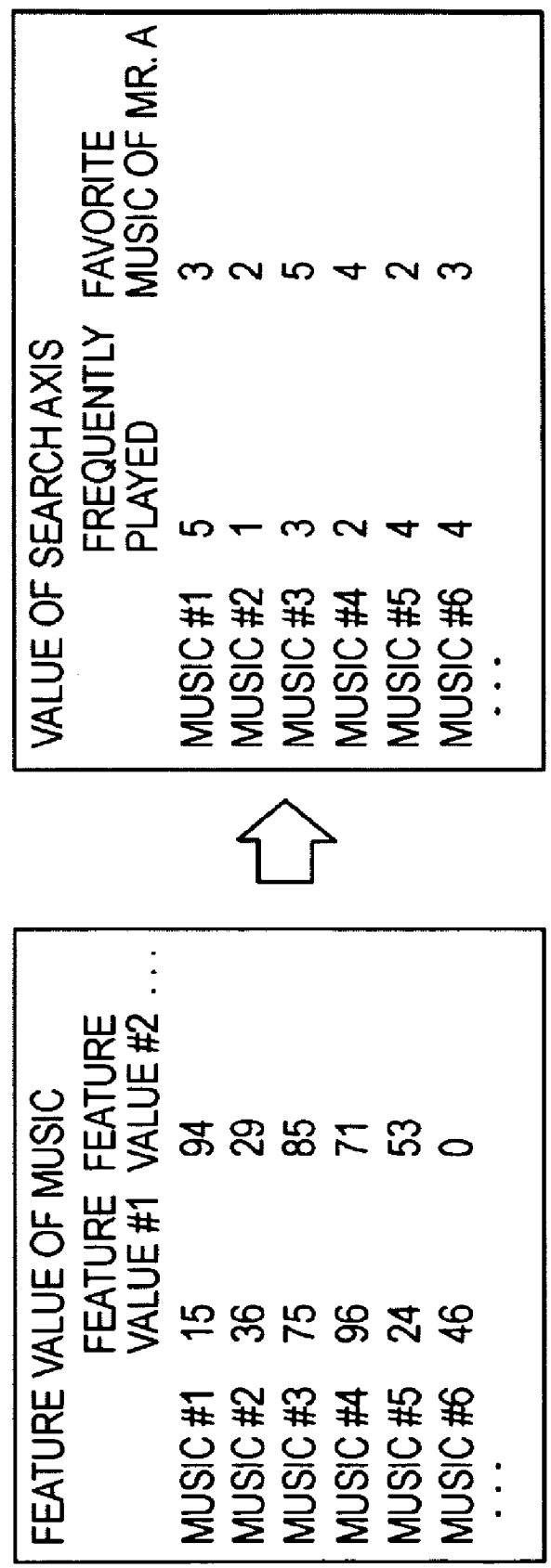
FIG. 33 is a diagram provided for an explanation of calculation of values of search axes.

More specifically, for example, as shown in FIG. 33, the search axis value calculation unit 39 applies the regression equation of the search axis in terms of the playback frequency determined on the basis of information associated with the user and the regression equation of the search axis in terms of the preference level determined on the basis of information associated with the one of the other users to the feature values of music #1 (more specifically, 15 as the feature value #1 and 94 as the feature value #2). As a result, 5 is obtained as the value for music #1 in terms of the playback preference and 3 is obtained as the value in terms of the preference level of Mr. A who is the one of the other users.

The search axis value calculation unit 39 also applies the regression equation of the search axis in terms of the playback frequency determined on the basis of information associated with the user and the regression equation of the search axis in terms of the preference level determined on the basis of information associated with the one of the other users to the feature values of music #2 (more specifically, 36 as the feature value #1 and 29 as the feature value #2). As a result, 1 is obtained as the value for music #2 in terms of the playback preference and 2 is obtained as the value in terms of the preference level of Mr. A who is the one of the other users.

Similarly, the search axis value calculation unit 39 applies the regression equation of the search axis in terms of the playback frequency determined on the basis of information associated with the user and the regression equation of the search axis in terms of the preference level determined on the basis of information associated with the one of the other users to the feature values of music #3 to music #6 to determine the value of each of music #3 to music #6 in terms of the playback preference and the value in terms of the preference level of Mr. A who is the one of the other users.

The search axis value calculation unit 39 supplies the calculated value of each search axis for each piece of music to the display 45.

In accordance with the value of each search axis for each piece of music, the display 45 displays the pieces of music owned by the user and the pieces of music owned by the one of the other users in a superimposed manner in the two or more dimensional space defined by the search axes.

More specifically, for example, as shown in FIG. 30, the display 45 displays the pieces of music owned by the user and the pieces of music owned by the one of the other users in a superimposed manner in the two-dimensional space defined by the search axis indicating the preference level determined on the basis of information associated with the user and the search axis indicating the preference level determined on the basis of information associated with Mr. A who is one of the other users.

Figure 34:
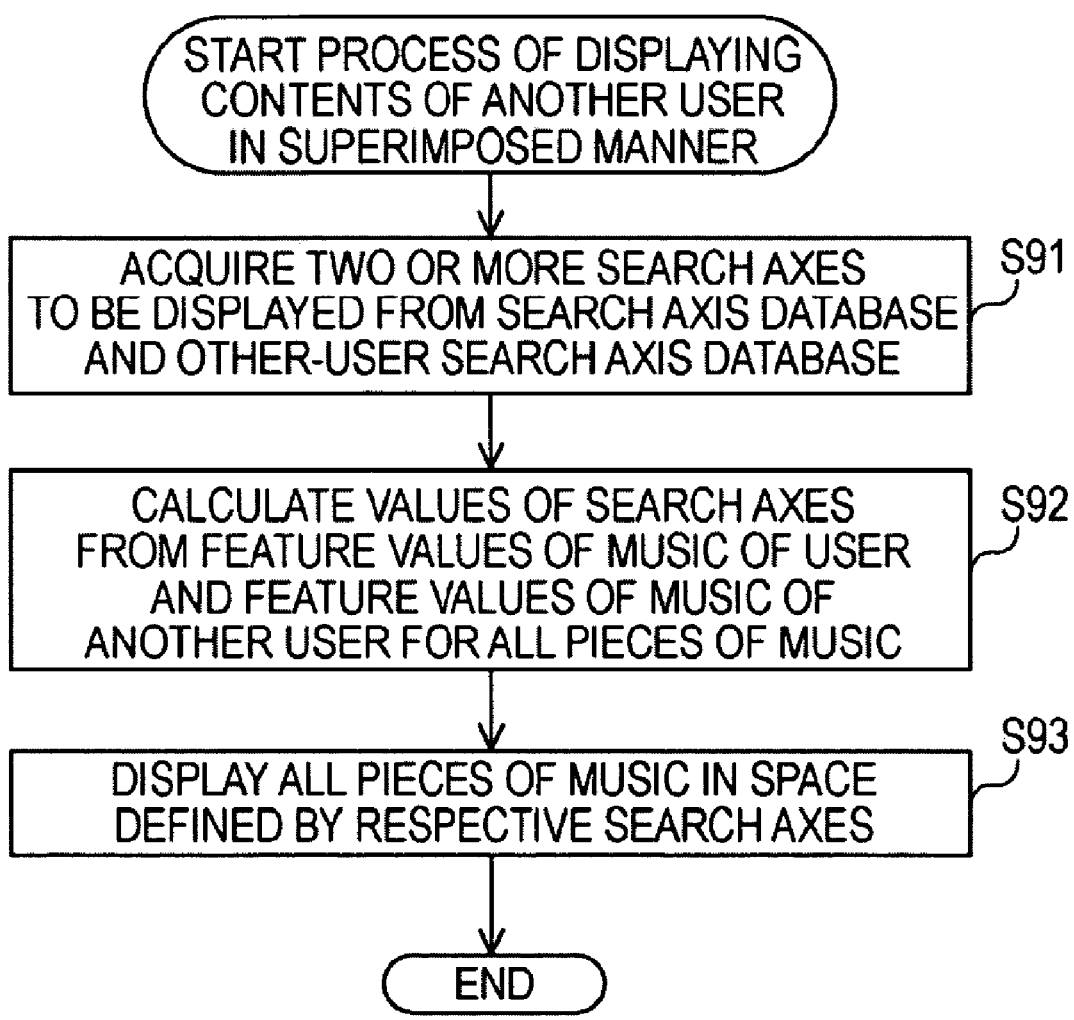
FIG. 34 is a flow chart illustrating a process of displaying contents owned by a user so as to be superimposed on contents owned by another user.

FIG. 34 is a flow chart illustrating a process of displaying contents owned by one of the other users so as to be superimposed on contents owned by the user. In step S91, the search axis acquisition unit 37 acquires two or more search axes used in displaying of contents from the search axis database 33 or the other-user search axis database 38. More specifically, the search axis comparison unit 44 acquires regression equations or discriminants according to which to calculate values in terms of the two or more search axes used in the displaying of contents from the search axis database 33 or the other-user search axis database 38.

In step S92, from the feature values of respective pieces of music owned by the user and respective pieces of music owned by the one of the other users, the search axis value calculation unit 39 calculates the value of each of all pieces of music owned by the user and each of all pieces of music owned by the one of the other users in terms of each search axis. More specifically, the search axis value calculation unit 39 acquires feature values of all pieces of music owned by the user from the feature value database 32 and feature values of all pieces of music owned by the one of the other users of interest from the other-user feature value database 40. The search axis value calculation unit 39 then calculates the value of each piece of music in terms of each search axis by applying the regression equation or the discriminant of each search axis to the feature values of each piece of music owned by the user or the one of the other users.

In step S93, the display 45 displays all pieces of music of the user and the one of the other users in the space defined by the search axes. If step S93 is completed, the process of displaying contents owned by one of the other users is ended. In this step S93, as shown in FIG. 30, the display 45 displays each piece of music at a location defined by the values of each piece of music in terms of the respective search axes in the two or more dimensional space defined by the search axes.

FIG. 35 is a flow chart illustrating a content selection process. In this processing flow, steps S121 to S124 are similar to steps S71 to S74 in FIG. 29, and thus a duplicated explanation thereof is omitted herein.

If it is determined in step S124 that the calculation of similarity is completed for all combinations of search axes, the process proceeds to step S125. In step S125, the search axis comparison unit 44 selects similar search axes on the basis of the calculated similarity. The search axis comparison unit 44 supplies the selected search axes to the display 45.

In step S126, the display 45 displays the selected similar search axes in a superimposed manner. More specifically, for example, as described above with reference to FIG. 26, the display 45 displays one of each pair of similar search axes with high intensity and the other one with low intensity in a superimposed manner.

In step S127, the search axis value calculation unit 39 calculates the value of each search axis from the feature values of music for each piece of music owned by the user and for each piece of music owned by the one of the other users, in a similar manner to step S92. More specifically, for example, the search axis value calculation unit 39 calculates the value, in terms of each search axis displayed with high intensity on the display 45, for each piece of music owned by the user and each piece of music owned by the one of the other users.

In step S128, the display 45 displays the location of each piece of music owned by the user and each piece of music owned by the one of the other users, in accordance with the value of each piece of music in terms each search axis. More specifically, the display 45 displays symbols indicating the respective pieces of music of the user and each piece of music of the one of the other users, at locations corresponding to the respective values of corresponding pieces of music in terms of the search axes.

In step S129, the music selection unit 41 selects particular pieces of music lying in ranges specified by the user in terms of the search axes. If step S129 is completed, the content selection process is ended. More specifically, for example, in step S129, the music selection unit 41 selects contents whose location with respect to the search axes lies within ranges specified by information given by the user via the operation unit 36.

As described above, the personalized search axes for use in searching are allowed to be used by other users.

The music search apparatus 11 produces search axes personalized for a particular user automatically or in accordance with information input by the user, and the produced search axes are allowed to be shared by a plurality of users.

Thus, the music search apparatus 11 allows the user to search for particular pieces of music using one or more general search axes (such as search axes used for searching contents on the basis of metadata) prepared in advance, one or more search axes produced by the music search apparatus 11 of the user, and/or one or more search axes produced by a music search apparatus 11 owned by another user.

The music search apparatus 11 compares the similarity between each produced search axis and each search axis of the one of the other users of interest, and the music search apparatus 11 presents search axes having high similarity to search axes of the one of the other users of interest. Alternatively, the music search apparatus 11 may present search axes having high similarity to search axes of the user.

If the user selects one of the presented search axis, the music search apparatus 11 searches for particular pieces of music on the basis of the selected search axis.

In the searching for particular pieces of music, the music search apparatus 11 places marks indicating music on a two or more dimensional map defined by arbitrary to or more search axes, and searches for particular pieces of music lying in a specified area on this map. The music search apparatus 11 may display marks indicating music owned by the one of the other users in a superimposed manner on the map.

Because the music search apparatus 11 compares the similarity between each search axis of the user and each search axis of the one of the other users and presents pairs of similar search axes, the user can know how the search axes of the user are evaluated by other users.

Because the music search apparatus 11 displays marks indicating contents owned by the users and marks indicating contents owned by one of the other users in a superimposed manner on the map defined by particular search axes, the user can know the distributions of contents owned by the one of the other users.

As described above, the user is allowed to search for particular pieces of music on the basis of search axes personalized for the user. More specifically, for example, the user is allowed to search for particular pieces of music which are favorite of the user, and/or which are played frequently, and/or which are of good music sense, and/or which the user wants to listen to while having a meal.

As described above, when the user issues a command to display values of contents in terms of search axes, contents are displayed in response to the command. In the case where the calculation is performed to determine the similarity between a first search axis, produced on the basis of information associated with the user, for use as a reference on the basis of which to present contents and a second search axis, produced on the basis of information associated with one of the other users, for use as a reference on the basis of which to present contents, and contents are presented according to a pair of first and second search axes detected as being similar to each other, the user can easily know the similarity of the manner in which contents are presented according to search axes of the user and the manner in which contents are presented according to search axes of one of the other users.

The music search apparatus 11 may be a stationarily installed home-use electronic apparatus such as a hard disk recorder, or a hard disk player or may be a home/portable game machine such as a portable mage machine, a portable electronic apparatus such as a portable player or a portable telephone.

The sequence of processing steps described above may be performed by hardware or software. When the processing sequence is executed by software, a program forming the software may be installed from a program storage medium onto a computer which is provided as dedicated hardware or may be installed onto a general-purpose computer capable of performing various processes in accordance with various programs installed thereon.

FIG. 36 is a block diagram illustrating an example of a computer configured to execute a program to perform the sequence of processing steps described above.

In this computer, a CPU (Central Processing Unit) 201, a ROM (Read Only Memory) 202, and a RAM (Random Access Memory) 203 are connected to each other via a bus 204.

The bus 204 is also connected to an input/output interface 205. The input/output interface 205 is also connected to an input unit 206 including a keyboard, a mouse, a microphone and the like, an output unit 207 including a display and a speaker, a storage unit 208 such as a hard disk drive or a nonvolatile memory, a communication unit 209 including a network interface, and a drive 210 adapted to drive a removable medium 211 such as a magnetic disk, an optical disk, a magnetooptical disk, or a semiconductor memory.

In the computer configured in the above-described manner, the CPU 201 loads a program from the storage unit 208 into the RAM 203 via the input/output interface 205 and the bus 204, and executes the loaded program thereby performing the above-described sequence of processing steps.

The program executed by the computer (CPU 201) may be provided, for example, via the removable medium in the form of a package medium, such as a magnetic disk (such as a floppy disk), an optical disk (such as a CD-ROM (Compact Disc-Read Only Memory) disk, DVD (Digital Versatile Disc), a magnetooptical disk, or a semiconductor memory. Alternatively, the program may be provided via a wireless or wire transmission medium such as a local area network, the Internet, or digital satellite broadcast.

In a state in which the removable medium 211 is mounted on the drive 210, the program stored on the removable medium 211 can be installed into the storage unit 208 via the input/output interface 205. The program may be received by the communication unit 209 via a wireless or wire transmission medium and stored in the storage unit 208 thereby installing the program in the computer. The program may be installed in the computer by storing the program in the ROM 202 or the storage unit 208 in advance.

The program may be executed by the computer sequentially in time in the same order as described above or may be executed in parallel. Arbitrary part such as a subroutine of the program may be executed in response to a call.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing method of determining information, to be presented to a user, as to one or more contents, comprising the steps of:

calculating the similarity between a first search axis, produced on the basis of information associated with the user, for use as a reference on the basis of which to present contents and a second search axis, produced on the basis of information associated with one of other users, for use as a reference on the basis of which to present contents, wherein the first search axis is produced on the basis of feature values of contents and a history of playback of the contents performed by the user or evaluations on the contents given by the user, and the second search axis is produced on the basis of feature values of contents and a history of playback of the contents performed by the one of the other users or evaluations on the contents given by the-one of the other users; and controlling displaying of information associated with contents with reference to first and second search axes detected as being similar to each other.

2. The method of claim 1, wherein calculating the similarity comprises:
calculating the correlation coefficient between the values indicated by the first search axis determined for the contents in accordance with a first regression equation and the values indicated by the second search axis determined for the contents in accordance with a second regression equation; and
employing the resultant correlation coefficient as the similarity between the first search axis and the second search axis.

3. The method of claim 1, wherein calculating the similarity comprises:
calculating the coincidence rate between the values indicated by the first search axis determined for the contents in accordance with a first discriminant and the values indicated by the second search axis determined for the contents in accordance with a second discriminant; and
employing the resultant coincidence rate as the similarity between the first search axis and the second search axis.

4. The method of claim 1, wherein controlling displaying information comprises displaying information associated with contents satisfying a predetermined condition in terms of the value indicated by a second search axis selected by the user from second search axes detected as being similar to the first search axis.

5. The method of claim 1, comprising selecting a content which is within a specified range in terms of the value indicated by the first search axis and which is also within a specified range in terms of the value indicated by the second search axis, from contents whose values with reference to the first and second search axes are displayed.

6. The method of claim 1, wherein controlling displaying information comprises displaying an image indicating the first search axis and an image indicating the second search axis detected as being similar to the first search axis in a superimposed manner.

7. An information processing apparatus adapted to determine information, to be presented to a user, as to one or more contents, comprising:
calculation means for calculating the similarity between a first search axis, produced on the basis of information associated with the user, for use as a reference on the basis of which to present contents and a second search axis, produced on the basis of information associated with one of other users, for use as a reference on the basis of which to present contents,
wherein the calculation means calculates the similarity between values of contents indicated by the first search axis and values of the contents indicated by the second search axis, and the calculation means employs the resultant similarity as the similarity between the first search axis and the second search axis; and
displaying control means for controlling displaying of information associated with contents with reference to first and second search axes detected as being similar to each other.

8. The information processing apparatus according to claim 7, wherein in the calculation of the similarity between the first and second search axes performed by the calculation means, the first search axis is produced on the basis of feature values of contents and a history of playback of the contents performed by the user or evaluations on the contents given by the user, and the second search axis is produced on the basis of feature values of contents and a history of playback of the contents performed by the one of the other users or evaluations on the contents given by the-one of the other users.

9. The information processing apparatus according to claim 7, wherein in the calculation of the similarity between the first and second search axes performed by the calculation means, the calculation means calculates the correlation coefficient between the values indicated by the first search axis determined for the contents in accordance with a first regression equation and the values indicated by the second search axis determined for the contents in accordance with a second regression equation, and the calculation means employs the resultant correlation coefficient as the similarity between the first search axis and the second search axis.

10. The information processing apparatus according to claim 7, wherein in the calculation of the similarity between the first and second search axes performed by the calculation means, the calculation means calculates the coincidence rate between the values indicated by the first search axis determined for the contents in accordance with a first discriminant and the values indicated by the second search axis determined for the contents in accordance with a second discriminant, and the calculation means employs the resultant coincidence rate as the similarity between the first search axis and the second search axis.

11. The information processing apparatus according to claim 7, wherein the displaying control means displays information associated with contents satisfying a predetermined condition in terms of the value indicated by a second search axis selected by the user from second search axes detected as being similar to the first search axis.

12. The information processing apparatus according to claim 7, further comprising selection means for selecting a content which is within a specified range in terms of the value indicated by the first search axis and which is also within a specified range in terms of the value indicated by the second search axis, from contents whose values with reference to the first and second search axes are displayed.

13. The information processing apparatus according to claim 7, wherein when the displaying control means controls displaying information associated with contents, the displaying control means displays an image indicating the first search axis and an image indicating the second search axis detected as being similar to the first search axis in a superimposed manner.

* * * * *